United States Patent [19]

Taniguchi et al.

[11] Patent Number: 5,442,405
[45] Date of Patent: Aug. 15, 1995

[54] FRAME SYNCHRONIZING CIRCUIT FOR FRAME SYNCHRONIZATION OF DIGITAL SIGNALS

[75] Inventors: Kenshi Taniguchi, Moriguchi; Masatoshi Tanaka, Kashihara; Noboru Mizuguchi, Osaka; Kiyoshi Uchimura, Hirakata, all of Japan

[73] Assignee: Matsushita Electric Industrial Co., Ltd., Kadoma, Japan

[21] Appl. No.: 172,025

[22] Filed: Dec. 22, 1993

[51] Int. Cl.$^6$ ............................................. H04N 5/08
[52] U.S. Cl. ................... 348/525; 348/526; 370/105.4; 375/368
[58] Field of Search ............... 358/513, 514, 471, 525, 358/472, 500, 526, 387; 370/100.1, 105.1, 105.4; 375/106, 116, 114, 111; H04N 5/08

[56] References Cited

FOREIGN PATENT DOCUMENTS 4-119738  4/1992  Japan .

*Primary Examiner*—James J. Groody
*Assistant Examiner*—David E. Harvey
*Attorney, Agent, or Firm*—Renner, Otto, Boisselle & Sklar

[57] ABSTRACT

A frame synchronizing apparatus is disclosed which includes a serial-parallel converter for converting input serial data into parallel data of a plurality of channels; a plurality of intra-channel synchronization detecting circuits each for detecting a synchronization pattern and a pseudo-synchronization pattern in one channel, and generating a channel synchronization detect signal and a pseudo-synchronization detect signal in one channel; a plurality of bit-shift error pattern detecting circuits each for detecting a bit-shift error pattern in one channel, and generating a bit-shift error pattern signal in one channel; a synchronization/bit-shift error detecting circuit for detecting a synchronization between channels and specifying the amount of erroneously shifted bits, and generating a frame synchronization detect signal and bit-shift error detect signals; and a bit-shift signal generating circuit for calculating the number of erroneously shifted bits in the serial-parallel converter based on the bit-shift error detect signals and the bit-shift error pattern signals, and generating a bit-shift signal to be supplied to the serial-parallel converter, whereby bits of the calculated number are shifted.

18 Claims, 25 Drawing Sheets

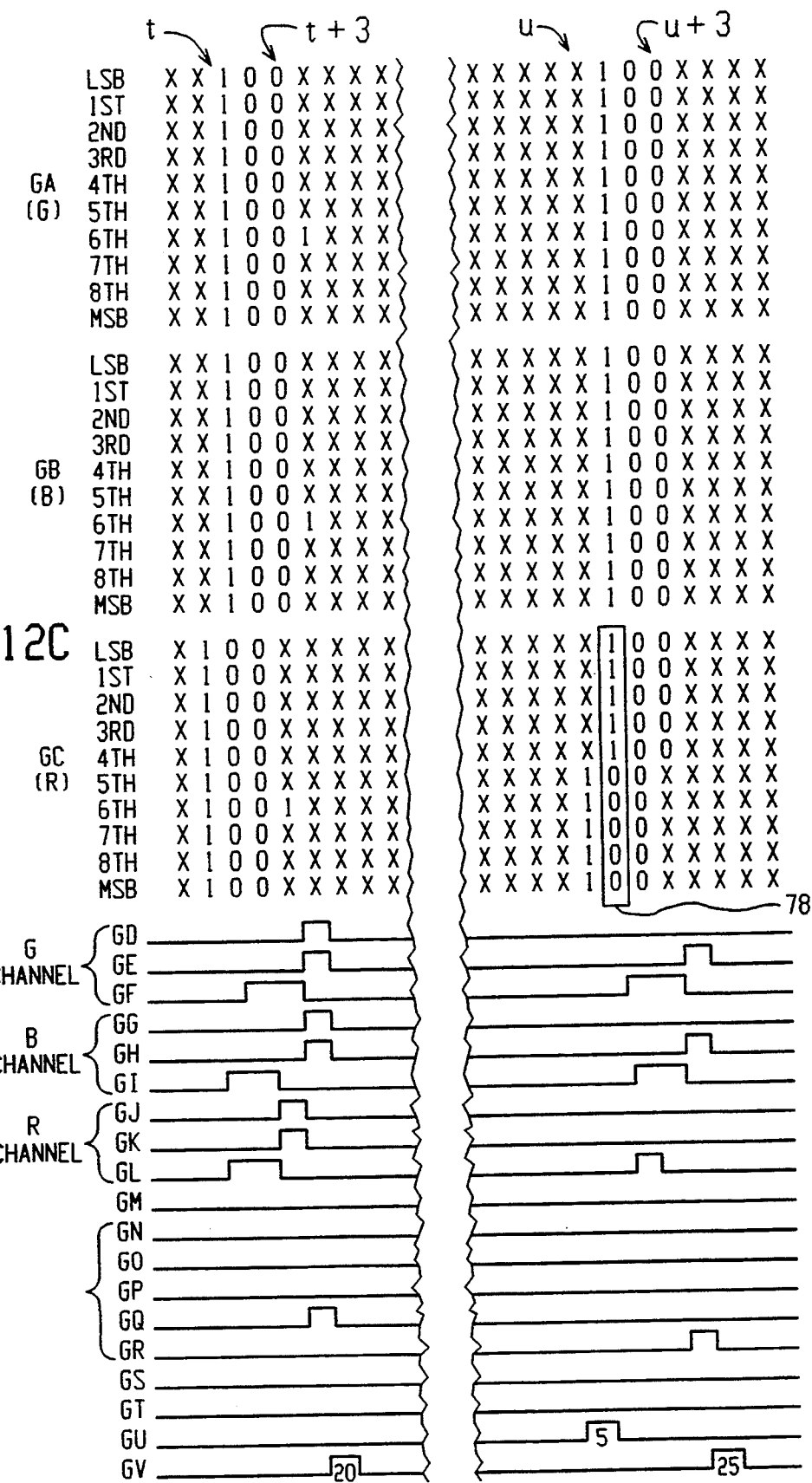

|   |         |   |   |   |   |   |
|---|---------|---|---|---|---|---|
|   | LSB     | x | x | 1 | 0 | 0 |
|   | 1ST BIT | x | x | 1 | 0 | 0 |
|   | 2ND BIT | x | 1 | 0 | 0 | x |
|   | 3RD BIT | x | 1 | 0 | 0 | x |
| G | 4TH BIT | x | 1 | 0 | 0 | x |
|   | 5TH BIT | x | 1 | 0 | 0 | x |
|   | 6TH BIT | x | 1 | 0 | 0 | x |
|   | 7TH BIT | x | 1 | 0 | 0 | x |
|   | 8TH BIT | x | 1 | 0 | 0 | x |
|   | MSB     | x | 1 | 0 | 0 | x |
|   |         |   |   |   |   |   |
|   | LSB     | x | 1 | 0 | 0 | x |
|   | 1ST BIT | x | 1 | 0 | 0 | x |
|   | 2ND BIT | x | 1 | 0 | 0 | x |
|   | 3RD BIT | x | 1 | 0 | 0 | x |
| B | 4TH BIT | x | 1 | 0 | 0 | x |
|   | 5TH BIT | x | 1 | 0 | 0 | x |
|   | 6TH BIT | x | 1 | 0 | 0 | x |
|   | 7TH BIT | x | 1 | 0 | 0 | x |
|   | 8TH BIT | x | 1 | 0 | 0 | x |
|   | MSB     | x | 1 | 0 | 0 | x |
|   |         |   |   |   |   |   |
|   | LSB     | x | 1 | 0 | 0 | x |
|   | 1ST BIT | x | 1 | 0 | 0 | x |
|   | 2ND BIT | x | 1 | 0 | 0 | x |
|   | 3RD BIT | x | 1 | 0 | 0 | x |
| R | 4TH BIT | x | 1 | 0 | 0 | x |
|   | 5TH BIT | x | 1 | 0 | 0 | x |
|   | 6TH BIT | x | 1 | 0 | 0 | x |
|   | 7TH BIT | x | 1 | 0 | 0 | x |
|   | 8TH BIT | x | 1 | 0 | 0 | x |
|   | MSB     | x | 1 | 0 | 0 | x |

FIG. 21

FRAME SYNCHRONIZING CIRCUIT FOR FRAME SYNCHRONIZATION OF DIGITAL SIGNALS

BACKGROUND OF THE INVENTION

1. Field of the Invention

The present invention relates to a frame synchronizing apparatus, and more particularly, to a frame synchronizing circuit for performing a frame synchronization of HDTV (high-definition television) digital signals which are transmitted in accordance with a 1125/60 HDTV system studio digital video signal standard which is prescribed by SMPTE 260M.

2. Description of the Related Art

Recently, HDTV devices have been intensively developed for the coming HDTV era. In SMPTE (Society of Motion Picture and Television Engineers), 1125/60 HDTV system studio digital video signal standard which is standardized as SMPTE 260M was developed as a standard for an interface between video devices which are used for producing a program in a studio and have digital video inputs and outputs, among HDTV devices having 1125 horizontal scanning lines and a field frequency of 60 Hz.

In the SMPTE 260M standard, in order to clearly define the timing relationship between the video signal and an analog synchronizing waveform, SAV (Start of Active Video) is transmitted at the start of each video data block, and EAV (End of Active Video) is transmitted at the end of each video data block. By detecting SAV and/or EAV in the transmitted digital signals, each video device can detect the timing of frame synchronization of video signals. Herein, "one frame" corresponds to one horizontal line of analog HDTV signals. FIG. 16 shows the timing relationship between an analog blanking interval, and EAV and SAV.

Table 1 shows the word construction of EAV and SAV.

TABLE 1

| WORD No. | BIT No. | | | | | | | | | |
|---|---|---|---|---|---|---|---|---|---|---|
| | 9 (MSB) | 8 | 7 | 6 | 5 | 4 | 3 | 2 | 1 | 0 (LSB) |
| 1 | 1 | 1 | 1 | 1 | 1 | 1 | 1 | 1 | 1 | 1 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 1 | F | V | H | $P_3$ | $P_2$ | $P_1$ | $P_0$ | 0 | 0 |

F = 0 : in a first field period
1 : in a second field period
V = 1 : in a field blanking interval
0 : in a period other than the field blanking interval
H = 0 : in SAV
1 : in EAV As is seen from Table 1, in the row of the first word, all of the bits (10 bits) are 1. In the rows of the second and third words, all of the bits are 0. Protection bits $P_0$, $P_1$, $P_2$, and $P_3$ in the row of the fourth word are used for performing a 1-bit error correction and a 2-bit error detection for the F, V, and H bits in the row of the fourth word.

In cases where the signal transmission between the video devices is performed serially by using one optical fiber and one coaxial cable, as is shown in FIG. 17A, a time division multiplex (TDM) is first performed in the order of Pb/Pr signals and Y signals, and then the transmission is sequentially performed from the LSB (Least Significant Bit). Also, in cases where signals in the RGB system are transmitted after a TDM, as is shown in FIG. 17B, the TDM is performed in the order of G signals, B signals and R signals, and then the transmission is sequentially performed from the LSB.

When the frame synchronization is to be detected from the serially transmitted signals, the frame synchronization can directly be detected from the transmitted serial data. However, the frame synchronization is usually detected after the transmitted serial data is converted into parallel data for the following reasons.

For example, if SMPTE 260M signals are serially transmitted, the transmission is performed at a high rate such as 1.5 Gbps or 2.2 Gbps. In order to detect the frame synchronization from the signals in the form of serial data, it is necessary to provide a detecting circuit which operates at a clock frequency of 1.5 GHz. Such a circuit which operates at such a high rate such as 1.5 Gbps consumes a very large amount of power, which causes the cost to increase. Accordingly, the detection of the frame synchronization after the signal transmission at a high rate is usually performed using parallel data which is obtained by a serial-parallel conversion. When the synchronization detection is performed by using the data after the serial-parallel conversion, a word synchronization can be realized at the same time as the detection of the frame synchronization. That is, the detection of the frame synchronization after the serial-parallel conversion has an additional advantage in that an accurate serial-parallel conversion can be attained at the same time as the detection of the frame synchronization.

In some cases where the frame synchronization can not be detected by using the data after the serial-parallel conversion, there is a possibility that a bit-shift error occurs in the previous serial-parallel conversion.

FIG. 18 shows the configuration of a conventional frame synchronizing apparatus in the RGB system. The transmitted serial data is input into a serial data input terminal 301 of a serial-parallel converting circuit 302 where the serial data is converted into parallel data. The parallel data is fed to a synchronization detecting circuit 303. The parallel data in the RGB system is constituted of 30 bits, i.e., 10 bits (one word) for each of R, G, and B signals.

FIG. 19 shows an example of the synchronization detecting circuit 303. As is seen from FIG. 19, the parallel data of 30 bits is input from an input terminal 41 as one unit. It is determined that there is synchronization by detecting that the succeeding 30 bits of 1, the next succeeding 30 bits of 0, and the next succeeding 30 bits of 0, and then detecting three bits of 1. The three bits of 1 correspond to the H bit (the sixth bit) in the row of the fourth word of EAV shown in Table 1. That is, in the illustrated circuit shown in FIG. 18, the frame synchronization is detected by using EAV.

A bit-shift signal generating circuit 304 generates a 1-bit shift signal when the frame synchronization cannot be detected during several frames. When the serial-parallel converting circuit 302 receives the 1-bit shift signal, the serial-parallel converting circuit 302 shifts the serial-parallel conversion by 1 bit. In other words, the breakpoint for every 30 bits is shifted by 1 bit. After the 1-bit shift signal is generated, the detection of frame synchronization is performed for the succeeding several frames. If the frame synchronization cannot be detected even after the 1-bit shift operation, the operation by the bit-shift signal generating circuit 304 is performed again, so as to detect the frame synchronization. In this way, the 1-bit shift operation is repeatedly performed until the synchronization is detected, so that the frame synchronization is realized. Such a frame synchronization detecting apparatus is described in, for example, Japanese Laid-Open Patent Publication No. 4-119738.

As described above, in The RGB system using SMPTE 260M signals, the serial signals are converted into parallel signals of 30 bits. This means that the bit-shift error occurs at any one of the possible 29 points. It is assumed that there occurs a 29-bit shift error. In such a case, it takes time for 29 frames to detect the synchronization, even if the 1-bit shift is performed once for each frame.

Other than the method in which 1-bit shift is performed as is shown in FIG. 19, a conventional frame synchronizing apparatus can adopt a method in which, in order to shorten the time required for the frame synchronization, a pattern of bit-shift error is read, and a plurality of bits are shifted in one bit-shift operation. In such a case, in order to accommodate any possible bit-shift error patterns, the frame synchronizing detecting circuit necessitates detecting circuits of which the number is equal to the number of bit-shift error patterns.

FIG. 20 shows an example of a frame synchronizing apparatus in the RGB system for correcting the bit-shift error in one shift operation by providing pattern detecting circuits of which the number is equal to the number of bit-shift error patterns. For example, FIG. 21 shows a 2-bit shift error pattern in the case where the 2-bit shift error occurs in the parallel-serial converting circuit. The bit-shift error pattern in FIG. 21 is detected by an RGB 2-bit shift error pattern detecting circuit 502 in FIG. 20.

FIG. 22 shows an exemplary configuration of the 2-bit shift error pattern detecting circuit 502 in FIG. 20. As is seen from FIG. 22, the 2-bit shift error pattern detecting circuit 502 has a relatively large scale circuit which requires at least three AND gates of 30 bits. Each Of the other bit-shift error pattern detecting circuits has the same configuration as that shown in FIG. 22. The conventional frame synchronizing circuit in FIG. 20 requires at least twenty-nine bit-shift error pattern detecting circuits such as that in FIG. 22. Such a number of bit-shift error pattern detecting circuits increase the scale of the conventional frame synchronizing circuit in FIG. 20.

As described above, in the case where the frame synchronizing apparatus for SMPTE 260M signals is constructed by conventional techniques, the power consumption is increased when the frame synchronization is detected from the serial data, and the time consumption is increased when the frame synchronization is detected from the parallel data and any bit-shift error to be corrected occurs. Moreover, if the time required for the bit-shift error correction is attempted to be shortened, there arises a problem in that the circuit scale for detecting bit-shift errors is greatly increased.

SUMMARY OF THE INVENTION

The frame synchronizing apparatus of this invention, includes: a serial-parallel converter for converting serial data to be input into parallel data having a plurality of channels, and for outputting the parallel data separately for each of the plurality of channels; a plurality of intra-channel synchronization detecting circuits each for receiving the parallel data in a corresponding one of the plurality of channels output from the serial-parallel converter, for detecting a synchronization pattern and a pseudo-synchronization pattern in the corresponding channel, and for generating a channel synchronization detect signal and a pseudo-synchronization detect signal in the corresponding channel; a plurality of bit-shift error pattern detecting circuits each for receiving the parallel data in a corresponding one of the plurality of channels output from the serial-parallel converter, for detecting a bit-shift error pattern in the corresponding channel, and for generating a bit-shift error pattern signal in the corresponding channel; a synchronization/bit-shift error detecting circuit for receiving the channel synchronization detect signals and the pseudo-synchronization detect signals, for detecting a synchronization between channels and specifying the amount of erroneously shifted bits, and for generating a frame synchronization detect signal and bit-shift error detect signals; and a bit-shift signal generating circuit for receiving the bit-shift error detect signals and the bit-shift error pattern signals, for calculating the number of erroneously shafted bits in the serial-parallel converter, and for generating a bit-shift signal, and supplying the bit-shift signal to the serial-parallel converter by which bits of the calculated number are shifted.

In another aspect of the invention, a frame synchronizing apparatus is provided. The frame synchronizing apparatus includes: a serial-parallel converter for converting serial data to be input into parallel data having a plurality of channels, and for outputting the parallel data separately for each of the plurality of channels; a plurality of intra-channel synchronization detecting circuits each for receiving the parallel data in a corresponding one of the plurality of channels output from the serial-parallel converter, for detecting a synchronization pattern and a pseudo-synchronization pattern in the corresponding channel, and for generating a channel synchronization detect signal, a pseudo-synchronization detect signal and an all-0 detect signal in the corresponding channel; a plurality of bit-shift error pattern detecting circuits each for receiving the parallel data in a corresponding one of the plurality of channels output from the serial-parallel converter, for detecting a bit-shift error pattern in the corresponding channel, and for generating a bit-shift error pattern signal in the corresponding channel; a synchronization/bit-shift error detecting circuit for receiving the channel synchronization detect signals, the pseudo-synchronization detect signals, and the all-0 detect signals, for detecting a synchronization between channels and specifying the amount of bits which are erroneously shifted, and for generating a frame synchronization detect signal and bit-shift error detect signals; and a bit-shift signal generating circuit for receiving the bit-shift error detect signals and the bit-shift error pattern signals, for calculating the number of erroneously shifted bits in the serial-parallel converter, and for generating a bit-shift signal, and supplying the bit-shift signal to the serial-parallel converter by which bits of the calculated number are shifted.

In one embodiment of the invention, the frame synchronizing apparatus further includes mode selecting means. The mode selecting means includes: first switching means for selecting the number of the plurality of channels of the parallel data converted in and output from the serial-parallel converter; and second switching means for switching the operation of the synchronization/bit-shift error detecting circuit depending on the selected number of the channels.

In another embodiment of the invention, the first switching means and the second switching means are controlled by a switching signal.

According to another aspect of the invention, a frame synchronizing method is provided. The method includes: a serial-parallel converting step for converting serial data to be input into parallel data having a plurality of channels, and for outputting the parallel data separately for each of the plurality of channels; an intra-channel synchronization detecting step for, in each of the plurality of channels, detecting a synchronization pattern and a pseudo-synchronization pattern of the parallel data, and for generating a channel synchronization detect signal, a pseudo-synchronization detect signal and an all-0 detect signal; a bit-shift error pattern detecting step for, in each of the plurality of channels, detecting a bit-shift error pattern of the parallel data, and for generating a bit-shift error pattern signal; a synchronization/bit-shift error detecting step for detecting a synchronization between channels and specifying the amount of bits which are erroneously shifted, based on the channel synchronization detect signal, the pseudo-synchronization detect signal, and the all-0 detect signal, and for generating a frame synchronization detect signal and bib-shift error detect signals; and a bit-shift signal generating step for calculating the number of erroneously shifted bits in the serial-parallel converting step, based on the bit-shift error detect signals and the bit-shift error pattern signal, and for generating a bit-shift signal by which bits of the calculated number are shifted.

In one embodiment of the invention, the frame synchronizing method further includes: a channel switching step for selecting the number of the plurality of channels of the parallel data converted in the serial-parallel converting step depending on the number of channels of video signals to be input; and a controlling step for controlling the synchronization/bit-shift error detecting step based on the number of the channels of the video signals.

Thus, the invention described herein makes possible the advantage of providing a frame synchronizing apparatus in which a bit-shift error correction is accomplished in a short time period even when any bit-shift error occurs, and in which a circuit scale is not increased.

This and other advantages of the present invention will become apparent to those skilled in the art upon reading and understanding the following detailed description with reference to the accompanying figures.

BRIEF DESCRIPTION OF THE DRAWINGS

FIGS. 12A to 12C show exemplary bit configurations of parallel input data of 2 channels and various signal waveforms illustrating the operation of the frame synchronizing apparatus of this invention.

FIG. 21 shows a 2-bit shift error pattern in the RGB system.

DESCRIPTION OF THE PREFERRED EMBODIMENTS

The present invention will be described hereinafter by way of illustrative examples.

EXAMPLE 1

Figure 1:
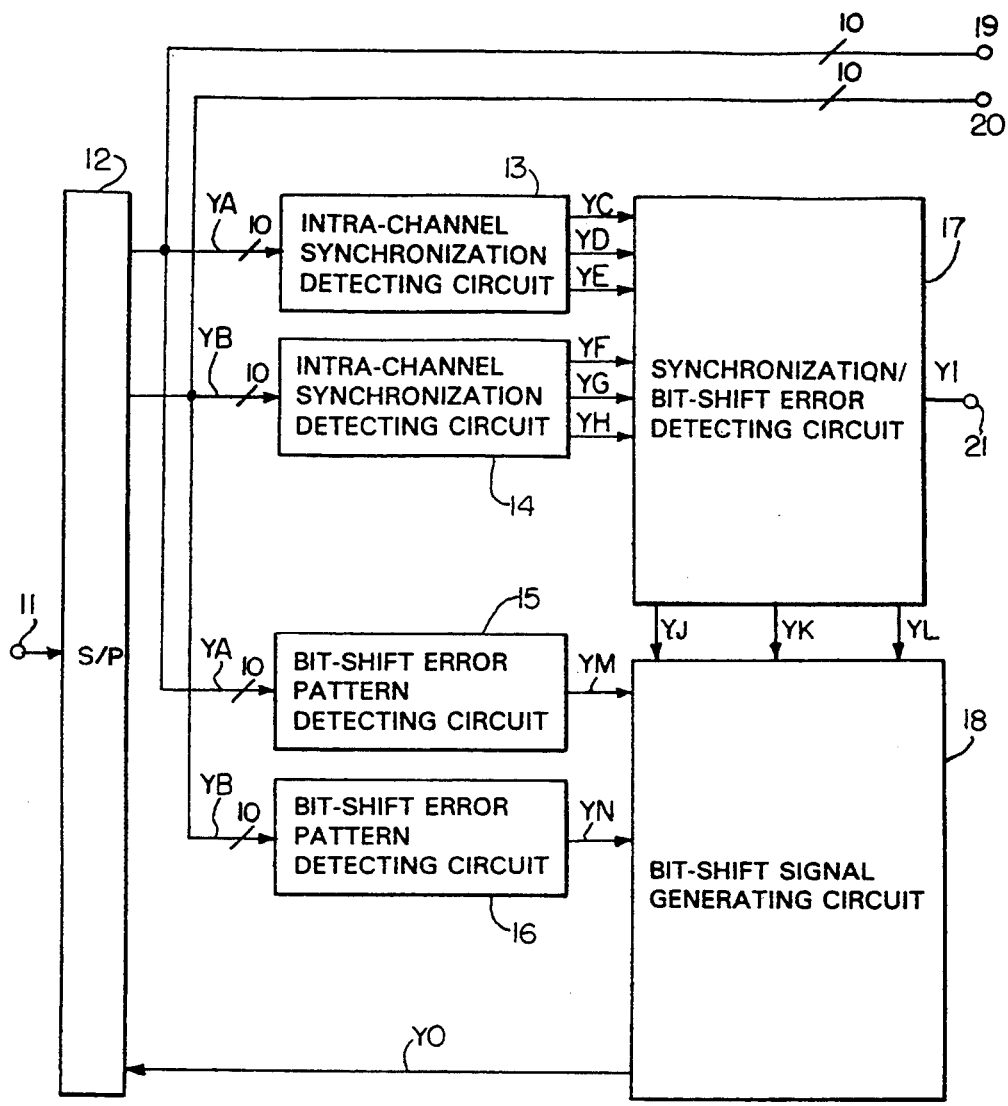
FIG. 1 shows one example of a frame synchronizing apparatus in a Y-Pb/Pr system according to the invention.

FIG. 1 shows one example of a frame synchronizing apparatus in a Y-Pb/Pr system according to the invention. Serial digital video signals input from a serial data input terminal 11 are converted into 2-channel parallel signals, i.e., a signal YA and a signal YB in a serial-parallel converting circuit 12. The signals YA and YB are input; into intra-channel synchronization detecting circuits 13 and 14, and bit-shift error pattern detecting circuits 15 and 16, respectively. Herein, in the signals YA and YB, 10 bits constitute 1 word. It is understood that the signals YA and YB may be constituted in another way.

Figure 7A:
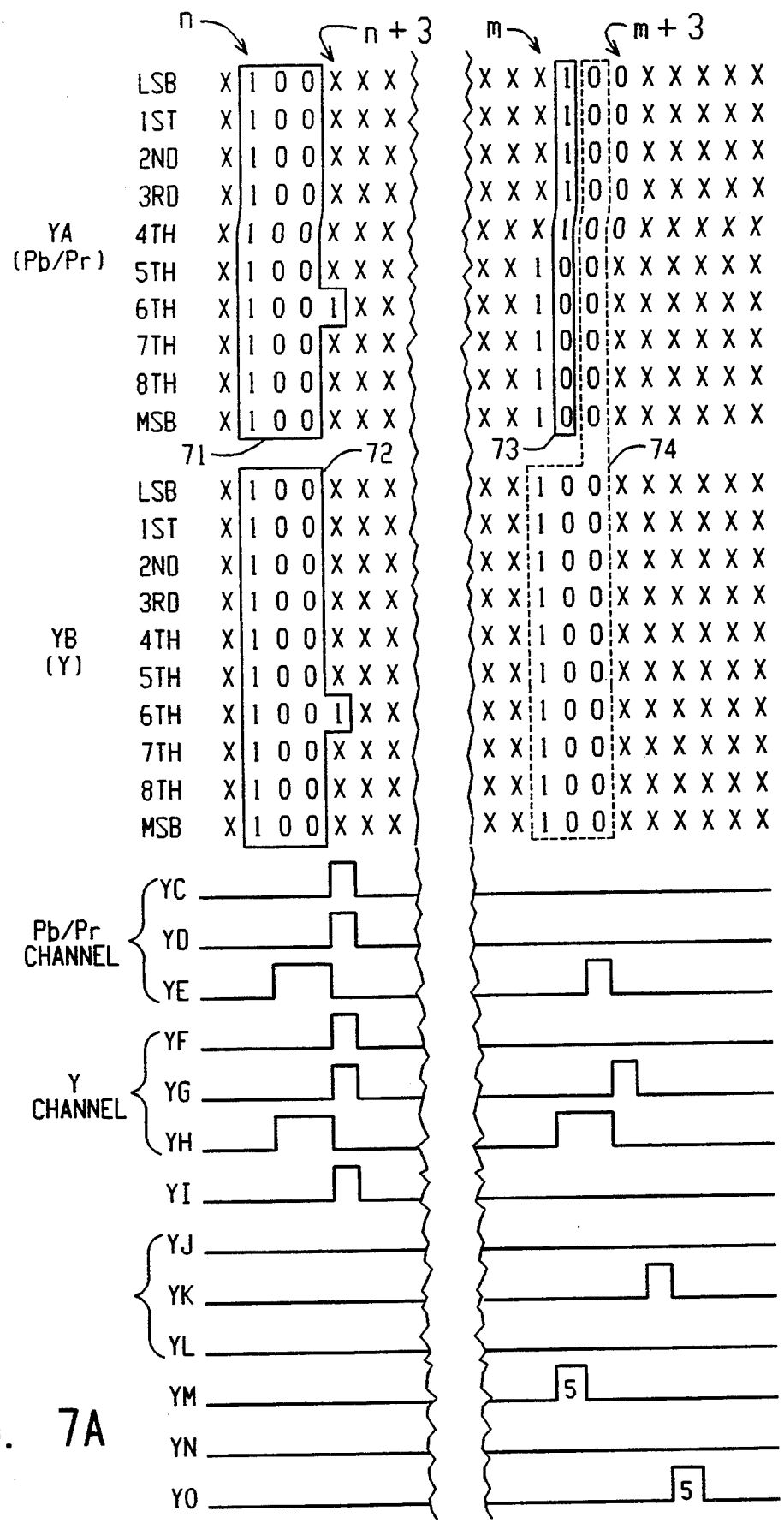
FIGS. 7A and 7B show exemplary bit configurations of parallel input data of 2 channels and various signal waveforms illustrating the operation of the frame synchronizing apparatus of this invention.

FIG. 7A shows exemplary bit configurations and word arrangements of ,the signals YA and YB. The signal YA is parallel input data of the Pb/Pr channel, and the signal YB is parallel input data of the Y channel in digital video signals of SMPTE 260M standard. The data indicated by X in FIG. 7A are data which take 1 or 0 (not determined for certain).

The operation of the frame synchronizing apparatus shown in FIG. 1 is first described.

The intra-channel synchronization detecting circuits 13 and 14 receive the parallel data output from the serial-parallel converting circuit 12 for respective channels, so as to detect a synchronization pattern and a pseudo-synchronization pattern. The intra-channel synchronization detecting circuit 13 generates a synchronization detect signal YC of the Pb/Pr channel, a pseudo-synchronization detect signal YD of the Pb/Pr channel, and an all-0 detect signal YE of the Pb/Pr channel. The intra-channel synchronization detecting circuit 14 generates a synchronization detect signal YF of the Y channel, a pseudo-synchronization detect signal YG of the Y channel, and a all-0 detect signal YH of the Y channel.

The bit-shift error pattern detecting circuits 15 and 16 receive the parallel data output from the serial-parallel converting circuit 12 for respective channels, so as to detect bit-shift error patterns of respective channels. The bit-shift error pattern detecting circuit 15 generates a bit-shift error pattern detect signal YM of the Pb/Pr channel. The bit-shift error pattern detecting circuit 16 generates a bit-shift error pattern detect signal YN of the Y channel.

A synchronization/bit-shift error detecting circuit 17 receives the synchronization detect signals YC and YF, the pseudo-synchronization detect signals YD and YG, and the all-0 detect signals YE and YH, so as to detect the synchronization between the two channels and specify the amount of bits which are erroneously shifted. The synchronization/bit-shift error detecting circuit 17 generates a frame-synchronization detect signal YI, and bit-shift error detect signals YJ, YK and YL. It is possible to detect the synchronization between channels and specify the amount of bits which are erroneously shifted without using the all-0 detect signals YE and YH. However, it is preferable to use the all-0 detect signals in order to more accurately detect the synchronization between channels and specify the amount of bits which are erroneously shifted. Hereinafter, the case where the all-0 detect signals are used is described.

A bit-shift signal generating circuit 18 receives the bit-shift error detect signals YJ to YL, and the bit-shift error pattern detect signals YM and YN, so as to calculate the number of bits erroneously shifted in the serial-parallel converting circuit 12. The bit-shift signal generating circuit 18 generates a bit-shift signal YO by which the calculated number of bits are shifted is supplied to the serial-parallel converting circuit 12.

Figure 2:
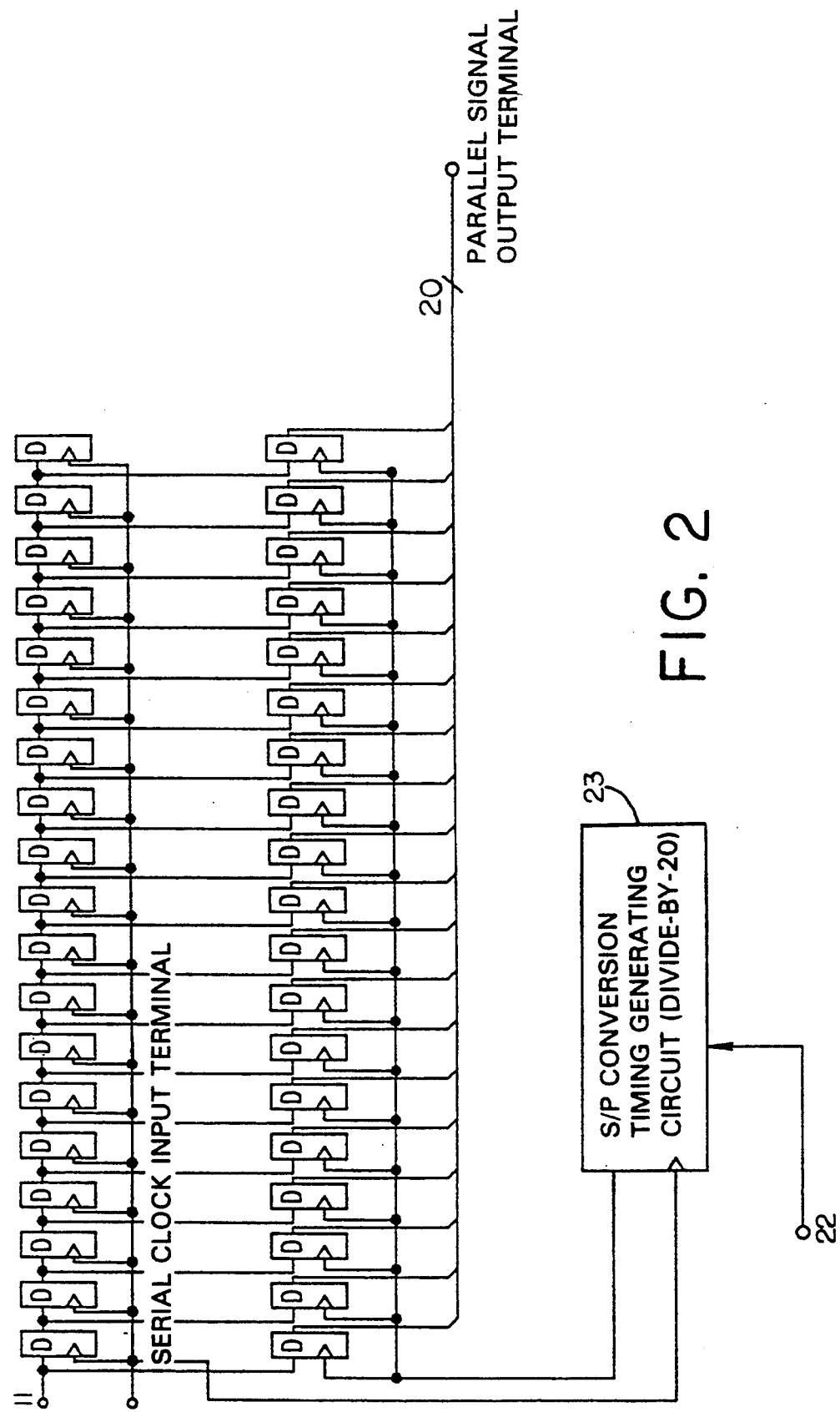
FIG. 2 shows a configuration of the serial-parallel Converting circuit shown in FIG. 1.

FIG. 2 shows the configuration of the serial-parallel converting circuit 12. The serial-parallel converting circuit 12 may include a usual shift register and a divide-by-twenty serial-parallel conversion timing generating circuit 23. The serial-parallel conversion timing generating circuit 23 changes the timing of the serial-parallel conversion in accordance with the bit-shift signal YO.

Figure 3:
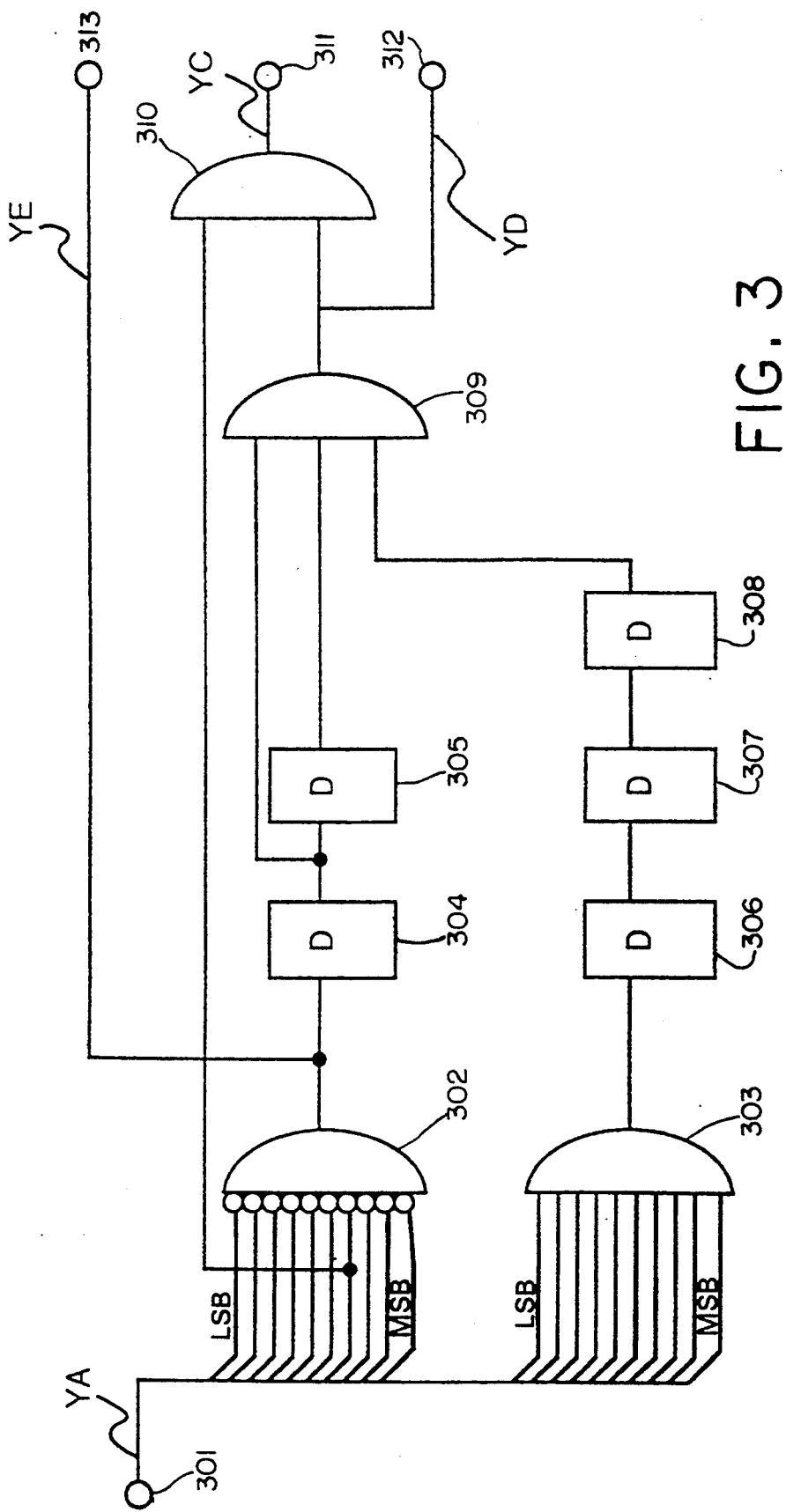
FIG. 3 shows a configuration of the intra-channel synchronization detecting circuit shown in FIG. 1.

As is shown in FIG. 3, the intra-channel synchronization detecting circuit 13 can be constituted by using AND circuits and delay circuits (D-type flip-flops). The parallel input data signal YA of the Pb/Pr channel is input to an input terminal 301. When the intra-channel synchronization detecting circuit 13 receives a pattern of 000 (HEX), i.e., a pattern of all ten bits of 0, it outputs the all-0 detect signal YE of the Pb/Pr channel to an output terminal 313. When the intra-channel synchronization detecting circuit 13 receives a pattern of 3FF, 000, and 000 (HEX), i.e., a pattern of all-1, all-0, and all-0, it outputs the pseudo-synchronization detect signal YD of the Pb/Pr channel to an output terminal 312. Immediately after the above 3 word patterns, i.e., all-1, all-0, and all-0, if the sixth bit of the next word (the fourth word) is 1, the intra-channel synchronization detecting circuit 13 outputs the frame-synchronization detect signal YC of the Pb/Pr channel is output to an output terminal 311. The sixth bit of the fourth word corresponds to the H bit of the EAV. The construction of the intra-channel synchronization detecting circuit 14 can be identical with that of the intra-channel synchronization detecting circuit 13.

Figure 5:
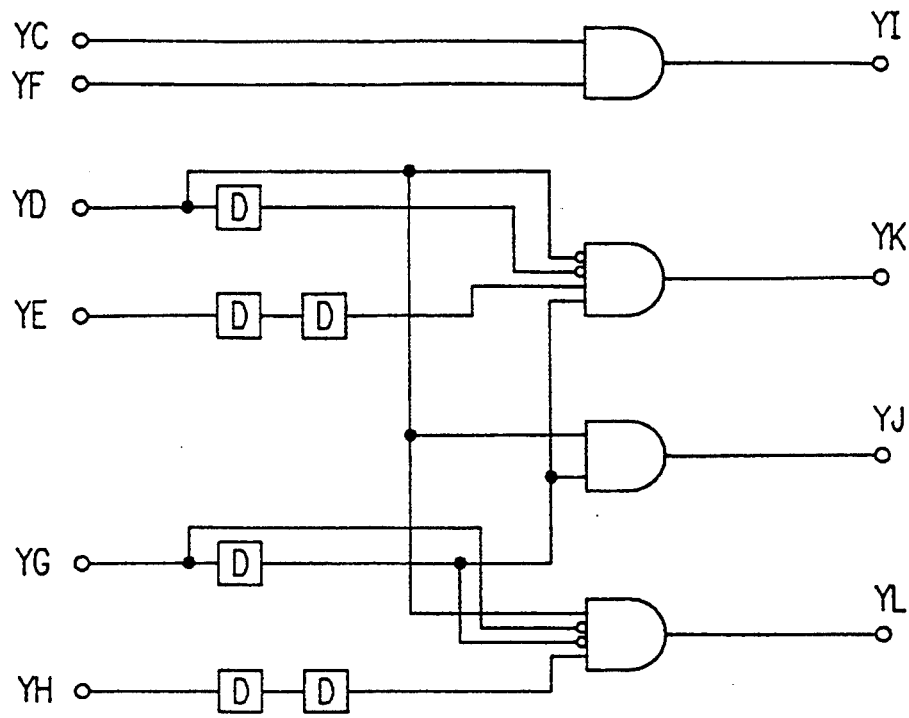
FIG. 5 shows one example of the synchronization/bit-shift error detecting circuit shown in FIG. 1.

FIG. 5 shows one example of the synchronization/bit-shift error detecting circuit 17. The synchronization/bit-shift error detecting circuit 17 can be constituted by delay circuits and AND circuits. The synchronization/bit-shift error detecting circuit 17 detects a frame synchronization or a bit-shift error based on the signals YC to YH and their input timings, and generates signals YI to YL depending on the detected result.

Figure 6:
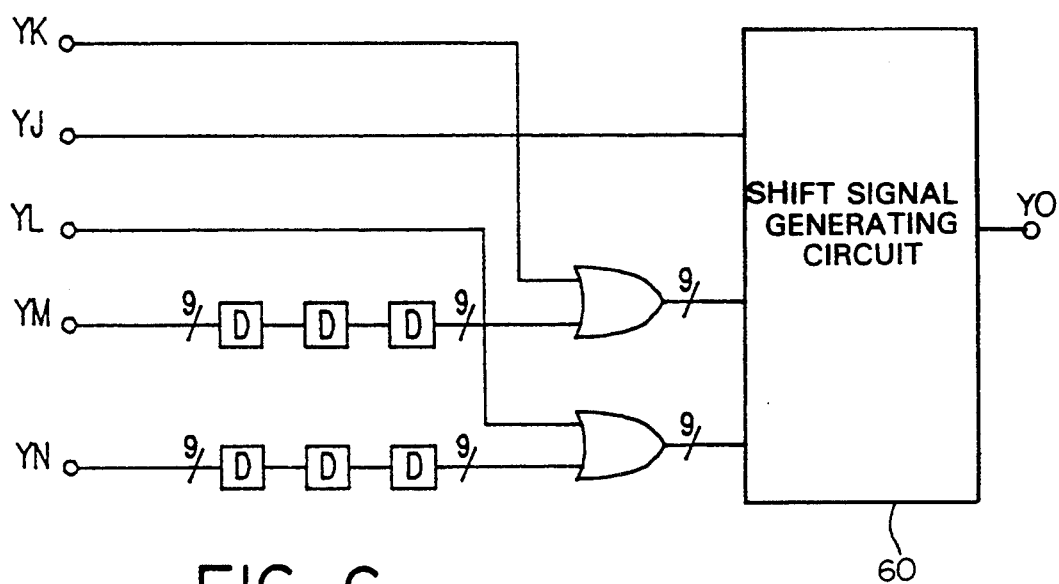
FIG. 6 shows one example of the bit-shift signal generating circuit shown in FIG. 1.

FIG. 6 shows one example of the bit-shift signal generating circuit 18. The bit-shift signal generating circuit 18 can be constituted by a bit-shift value calculating circuit using delay circuits and OR circuits, and a shift signal generating circuit 60 for generating a bit-shift signal based on the calculated result.

Next, referring to FIG. 7A, the respective signals output from the intra-channel synchronization detecting circuit 13 will be described in more detail.

When the intra-channel synchronization detecting circuit 13 detects a pattern of the signal YA in which bits in the nth word are all 1, bits in the (n+1)th and (n+2)th words are all 0, and then the sixth bit in the (n+3)th word is 1, the synchronization detect signal YC (HIGH) is output. Similarly, when the intra-channel synchronization detecting circuit 13 detects a pattern of the signal YB in which bits in the nth word are all 1, bits in the (n+1)th and (n+2)th words are all 0, and then the sixth bit in the (n+3)th word is 1, the synchronization detect signal YD (HIGH) is output. Specifically, when patterns 71 and 72 enclosed by solid lines of the signals YA and YB An FIG. 7A are matched, both the signals YC and YG are output.

The patterns of the signals YA and YB are identical with EAV in the video timing reference code of the SMPTE 260M signal. In video data portions of the video signal other than EAV, the patterns 71 and 72 enclosed by solid lines cannot simultaneously occur in both signals YA and YB. Accordingly, when both signals YC and YF are simultaneously output, is determined that the inter-channel synchronization between the Pb/Pr channel and the Y channel is detected, so that the synchronization/bit-shift error detecting circuit 17 in FIG. 1 output the frame synchronization detect signal YI. In this case, the bit-shift signal YO is not output. In the above example, the case where there is no bit-shift error in the parallel input data is described.

The mth word to the (m+3)th word An FIG. 7A show patterns in a case where a bit-shift error of the parallel input data occurs in the serial-parallel converting circuit, and hence a 5-bit shift error occurs in a pattern of EAV or SAV.

When a pattern of all ten bits of 0 is detected in the (m+2) word of the parallel data of Pb/Pr channel (the signal YA), the intra-channel synchronization detecting circuit 13 outputs The all-0 detect signal YE of the Pb/Pr channel. Since a pattern of all-1, all-0, and all-0 appears in the mth to (m+3)th words of the parallel data of Y channel (the signal YB), the intra-channel synchronization detecting circuit 14 outputs the pseudo-synchronization detect signal YG and the all-0 detect signal YH of the Y channel, The synchronization detect signal YC and the pseudo-synchronization detect signal YD of the Pb/Pr channel and the synchronization detect signal YF of the Y channel are not output.

The signal YG is detected, and in the previous data word, the signal YE is detected but the signal YD is not detected. As the result of such detection, it is determined that the EAV or SAV may be erroneously shifted by 1 to 9 bits in the parallel input data for the following reasons.

The detection of both the signals YG and YE as shown in FIG. 7A can not be accomplished until the patterns enclosed by broken lines 74 are realized in the mth to (m+3)th word of the parallel input data. The patterns indicate that at least thirty bits of 0 are continuously included. EAV and SAV each include forty successive bits of 0. Accordingly, even when any possible bit-shift error occurs, in the parallel input data of at least one of the two channels, there may exist a pattern in which bits of successive 2 words are all 0 (in this example, the (m+1)th and (m+2)th words of the Y channel signal YB). In the case where there is no bit-shift error, as described above, there occurs a pattern in which bits of the successive two words are all 0 both in the two channels. As described above, video data portions of the video signal other than EAV or SAV, there is no possibility-that the pattern of 20-bit all 1 and 40-bit all 0 will occur, so that the portion where the pseudo-synchronization detect signal YG is detected can be determined to be the EAV or SAV portion.

When the signal YG is detected, and in the previous data word, the signal YE is detected but the signal YD is not detected, the synchronization/bit-shaft error detecting circuit 17 outputs a 1-to-9 bit-shift error detect signal YK.

In the (m+1)th word enclosed by a solid line in the parallel input data of Pb/Pr channel shown in FIG. 7A, LSB to the fourth bits are 1, and the fifth bit to MSB are 0. If the 1-to-9 bit shift error occurs, the number of bits of 1 in a pattern 73 enclosed by the solid line is equal to the number of erroneously shifted bits. The number of erroneously shifted bits is detected by the bit-shift error pattern detecting circuits 15 and 16.

Figure 4:
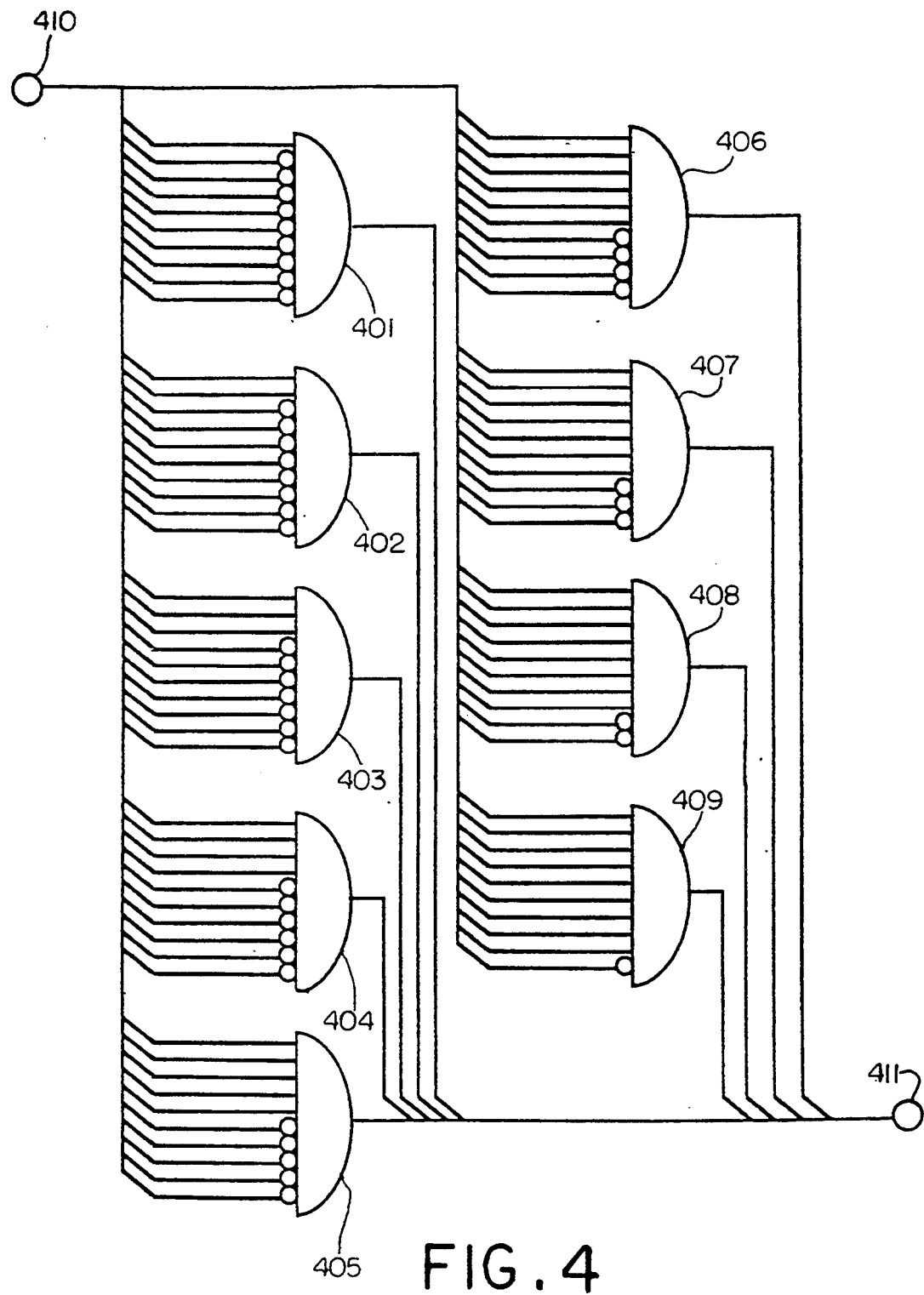
FIG. 4 shows one example of the bit-shift error pattern detecting circuit shown in FIG. 1.

For example, a 5-bit shift error occurs as shown in FIG. 7A, a 5-bit shift error pattern detecting circuit 406 in the bit-shift error pattern detecting circuit 15 shown in FIG. 4 detects the bit-shift error. A 5-bit shift error pattern detect signal YM(5) is output to the bit-shift signal generating circuit 18.

When the signal YK is output from the synchronization/bit-shift error detecting circuit 17 and the 5-bit-shift error pattern detect signal YM(5) is output, the bit-shift signal generating circuit 18 generates a 5-bit-shift signal YO(5).

In this way, the 5-bit shift error which occurs in the serial-parallel converting circuit 12 can be corrected by one bit-shift operation. AS a result, in the next EAV portion, a proper frame synchronization can be detected.

In addition to the 5-bit shift error, when bit-shift errors of 1 to 9 bits are detected, such bit-shift errors can be corrected in the same way as described above. Note that the bit-shift error pattern detect signal YM may be YM(1) to YM(9), depending on the number of erroneously shifted bits.

Figure 7B:
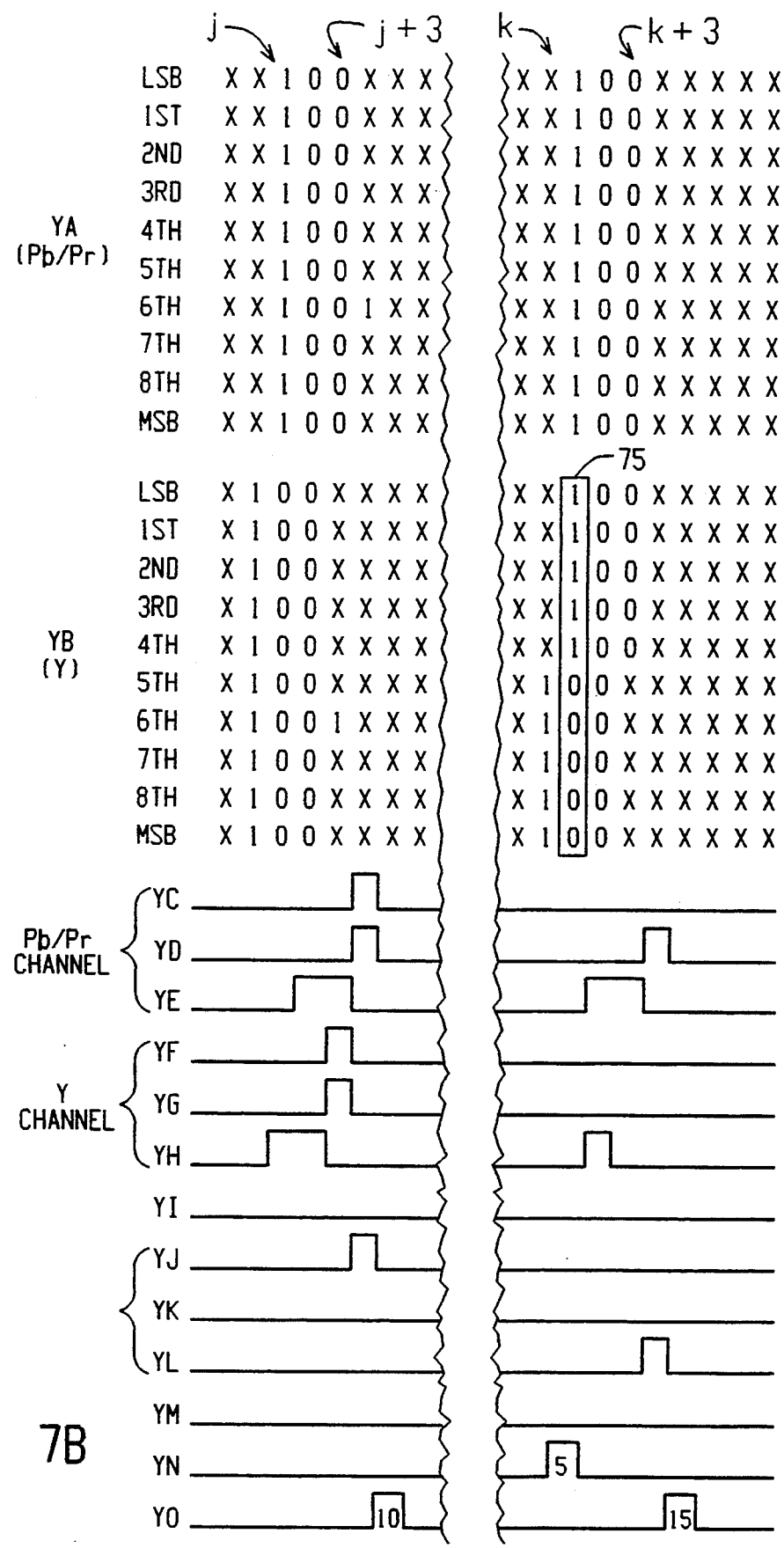

FIG. 7B shows a pattern of the EAV part in a case where a 10-bit shift error occurs in the parallel input data (the jth word to the (j+4)th word of the signals YA and YB). When a signal having such a pattern is input, the intra-channel synchronization detecting circuit 13 detects a pseudo-synchronization in the (j+4)th word of the signal YA (ten bits of 1, ten bits of 0 and ten bits of 0), and outputs the pseudo-synchronization detect signal YD of the Pb/Pr channel. In the same way, the intra-channel synchronization detecting circuit 14 detects a pseudo-synchronization in the (j+3)th word of the signal YB, and outputs the pseudo-synchronization detect signal YG of the Y channel.

Such a case, that is, the case where both the pseudo-synchronization detect signals YD and YG of the Pb/Pr and Y channels are output, but the pseudo-synchronization detect signal YG is generated earlier by one data word is limited to the EAV or SAV case. The pattern including 40 successive bits of 0 will not exist except for EAV or SAV.

The synchronization/bit-shift error detecting circuit 17 detects the signal YD and detects the signal YG earlier than the signal YD by 1 data word, so as to generate a 10-bit shift error detect signal YJ and to output the signal to the bit-shift signal generating circuit 18. When the bit-shift signal generating circuit 18 receives the signal YJ, it outputs the bit-shift signal YO(10) for shifting 10 bits in the (j+5)th word.

As is shown in FIG. 7B, in the case of EAV, the synchronization detect signal YC of the Pb/Pr channel is output at the timing later by 1 data word than the timing at which the synchronization detect signal YF of the Y channel is output. In both the EAV and SAV cases, the timings of the all-0 detect signals YE and YH of the Pb/Pr and Y channels are also shifted by 1 data word. In this example, the synchronization/bit-shift error detecting circuit 17 detects the 10-bit shift error by using the pseudo-synchronization detect signals YD and YG. It is appreciated that the 10-bit shift error can be detected by using the synchronization detect signals YC and YF or using the all-0 detect signals YE and In FIG. 7B, the kth word to the (k+3)th word of the signals YA and YB show a pattern of the EAV or SAV part in a case where a 15-bit shift error occurs in the parallel input data. The intra-channel synchronization detecting circuit 13 outputs the pseudo-synchronization detect signal YD of the Pb/Pr channel in the (k+4)th word. The intra-channel synchronization detecting circuit 14 outputs the all-0 detect signal YH of the Y channel in the (k+2) word.

When the signal YD is detected, and the signal YH is detected 2 data words before the detection of the signal YD, but the signal YG is not detected, the synchronization/bit-shift error detecting circuit 17 outputs the 11-to-19 bit-shift error detect signal YL.

The bit-shift error pattern detecting circuit 16 detects the 5-bit shift error from the data in a pattern 75 enclosed by a solid line, and outputs the 5-bit shift error pattern detect signal YN(5). The 11-to-19 bit-shift error detect signal YL is input into the bit-shift signal generating circuit 18 in the (k+4)th word. In the (k+1)th word which is earlier by 3 words, the 5-bit shift error pattern detect signal YN(5) is input. AS a result, the bit-shift signal generating circuit 18 detects the erroneous shift of 15 bits, so as to output the 15-bit shift signal YO(15) to the serial-parallel converting circuit 12.

In the serial-parallel converting circuit 12, in accordance with the received signal YO(15), the erroneous shift of words caused by the bit-shift error is corrected. Accordingly, the 15-bit shift error occurring in the serial-parallel converting circuit 12 is corrected by only one bit-shift operation, so that a correct frame synchronization can be detected in the next EAV portion.

In cases where bit-shift errors of 11 to 19 bits are detected other than the 15-bit shift error, the bit-shift errors can be detected in the same way as described above. Note that the bit-shift error pattern detect signal YN may be YN(1) to YN(9) depending on the number of bits erroneously shifted.

As described above, the frame synchronizing apparatus of this invention can correct the bit-shift error by only one bit-shift operation by performing a synchronization detection and a bit-shift error pattern detection for each channel. Accordingly, the frame synchronizing apparatus of this invention can correct any shift error of 1 bit to 19 bits in the video signals (Y-Pb/Pr system) of SMPTE 260M standard in a shorter time.

Figure 20:
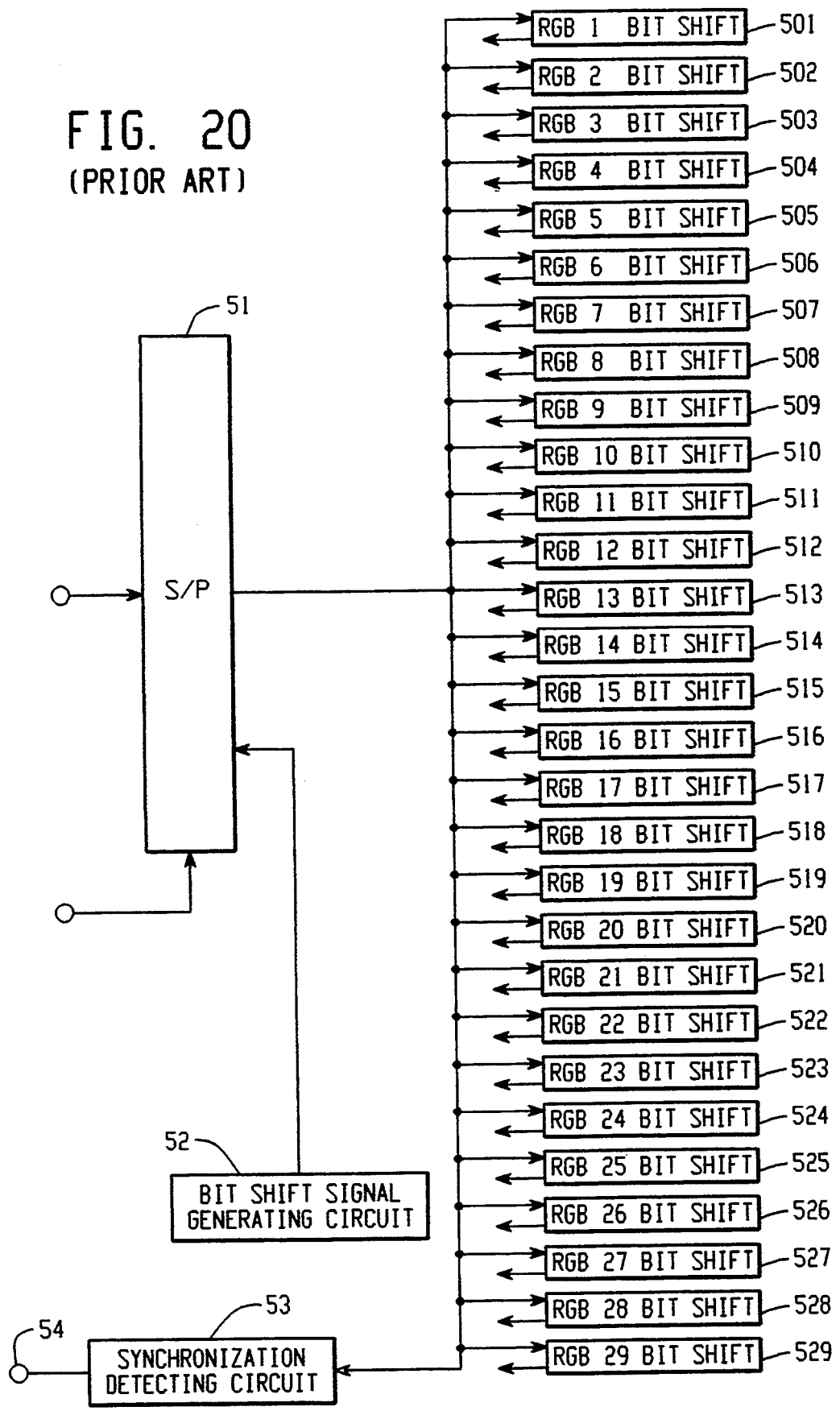
FIG. 20 shows another example of a conventional frame synchronizing apparatus in the RGB system.

Moreover, the frame synchronizing apparatus of this invention can greatly reduce the number of bit-shift error pattern detecting circuits as compared with the conventional frame synchronization detecting circuit shown in FIG. 20, so that the frame synchronizing apparatus of this invention having a smaller circuit scale can be realized.

In this invention, the: synchronization is detected after the serial to parallel conversion, so that the operating speed of the synchronization detecting circuit can be lowered. This reduces the amount of power to be consumed.

EXAMPLE 2

Figure 8:
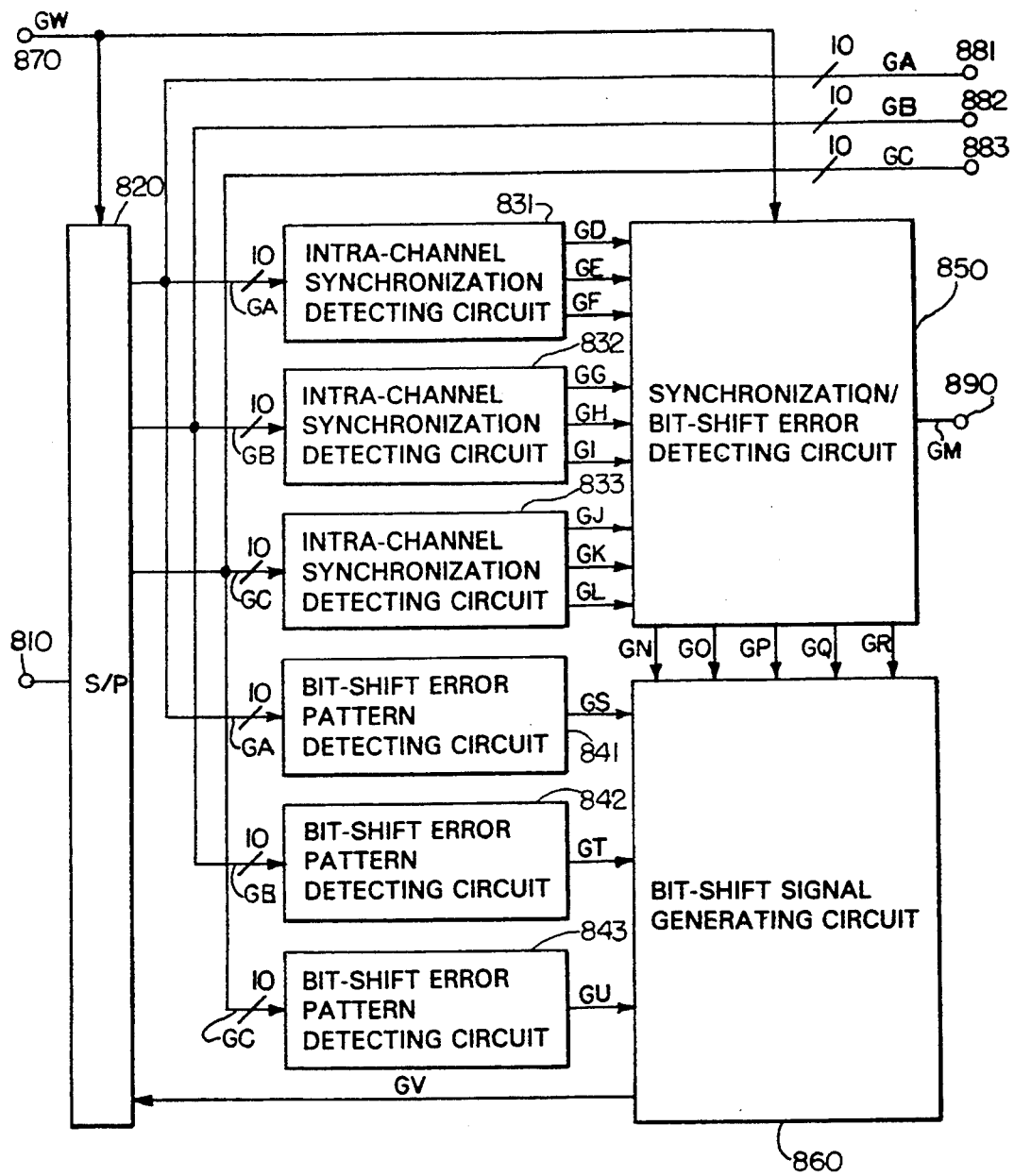
FIG. 8 shows a frame synchronizing apparatus of the second example according to the invention.

FIG. 8 is a block diagram showing a configuration of a frame synchronizing apparatus of the second example according to the invention. The frame synchronizing apparatus of the second example is applicable to both the RGB system and the Y-Pb/Pr system of the video signals of SMPTE 260M standard.

The intra-channel synchronization detecting circuits 831, 832 and 833 in FIG. 8 are identical with the intra-channel synchronization detecting circuits 13 and 14 in the first example, so that the configuration thereof is shown in FIG. 3. The bit-shift error pattern detecting circuits 841, 842 and 843 in FIG. 8 are identical with the bit-shift error pattern detecting circuits 15 and 16 in the first example, so that the configuration thereof is shown in FIG. 4.

To an input terminal 870, a switching signal GW is input so as to selectively drive the frame synchronizing apparatus in either one of the Y-Pb/Pr mode for the Y-Pb/Pr system or the RGB mode for the RGB system. The switching signal GW is fed to a serial-parallel converting circuit 820, and a synchronization/bit-shift error detecting circuit 850, and they operate in either one of the Y-Pb/Pr mode or the RGB mode in accordance with the switching signal GW.

Figure 9:
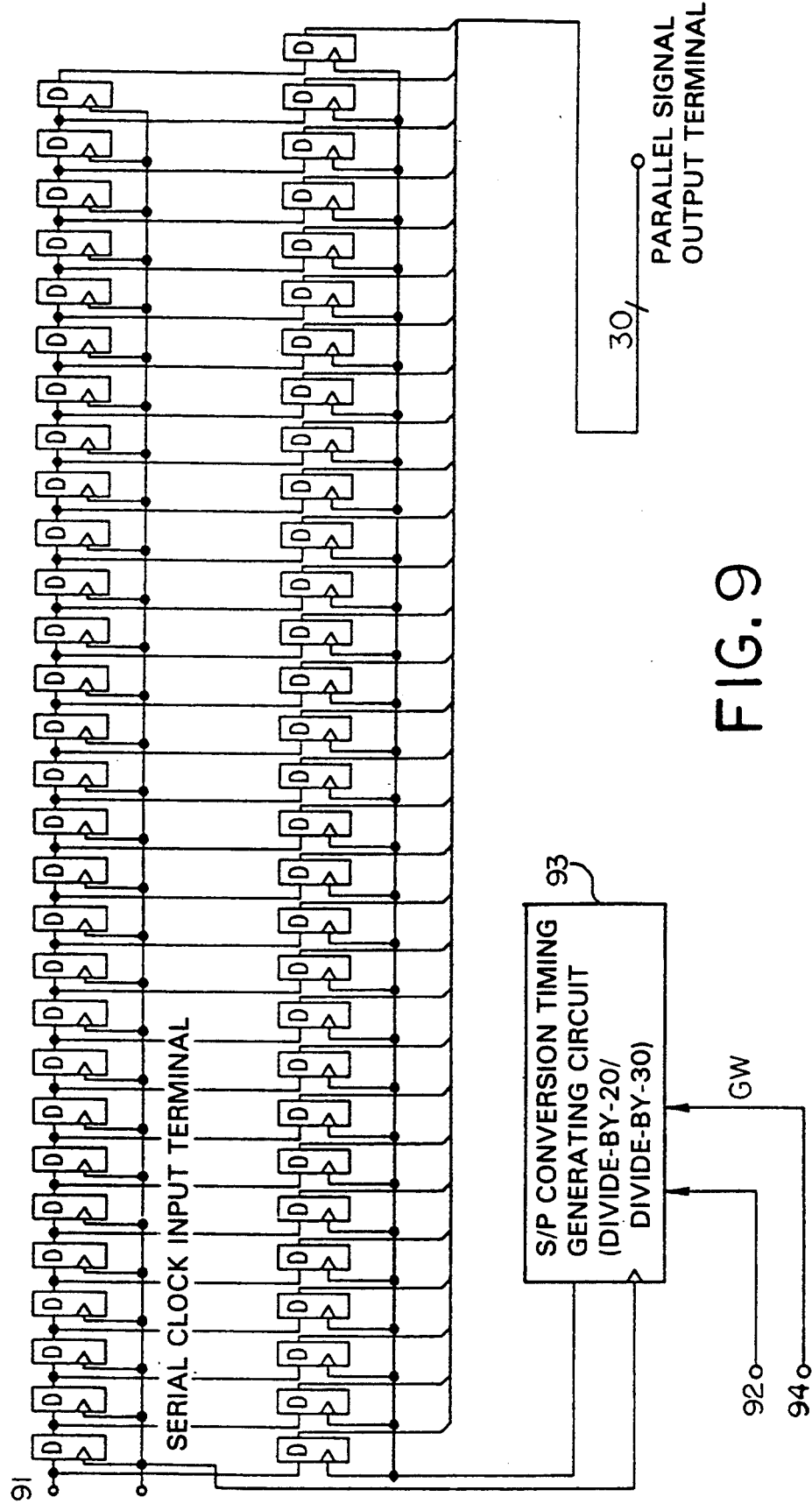
FIG. 9 shows one example of the serial-parallel converting circuit shown in FIG. 8.

FIG. 9 shows one example of the serial-parallel converting circuit 820. The serial-parallel converting circuit 820 can be constituted by a usual shift register, and a serial-parallel conversion timing generating circuit 93 which can be switched for a divide-by-20 circuit or a divide-by-30 circuit. The serial-parallel conversion timing generating circuit 93 selectively converting the signals input through a serial data input terminal 91 into parallel signals for 2 channels (20 bits) or parallel signals for 3 channels (30 bits), in accordance with the switching signal GW which is supplied via a switching signal input terminal 940, so as to output the converted parallel signals. The serial-parallel conversion timing generating circuit 93 changes the timing of the serial-parallel conversion in accordance with a bit-shift signal GV which is input via a bit-shift signal input terminal 92.

First, a case where the Y-Pb/Pr mode is selected is described.

In this case, parallel input data of 2 channels are output from the serial-parallel converting circuit 820, so that only the signals GA and GB are output, but the signal GC is not output. Accordingly, no signal is applied to the intra-channel synchronization detecting circuit 833 and to the bit-shift error pattern detecting circuit 843. In this case, the signals GA and GB are equivalent to the signals YA and YB shown in FIGS. 7A and 7B. Therefore, the intra-channel synchronization detecting circuits 831 and 832, and the bit-shift error pattern detecting circuits 841 and 842 operate in the same way as in Example 1. In other words, when input parallel data of 2 channels (signals YA and YB) are input, the intra-channel synchronization detecting circuits 831 and 832 output the same signals as those from the intra-channel synchronization detecting circuits 13 and 14, because the intra-channel synchronization detecting circuits 831 and 832 have the same configuration as that of the intra-channel synchronization detecting circuits 13 and 14. Since the bit-shift error pattern detecting circuits 841 and 842 have the same configuration as that of the bit-shift error pattern detecting circuits 15 and 16, The bit-shift error pattern detecting circuits 841 and 842 output the same signals as those from The bit-shift error pattern detecting circuits 15 and 16.

Figure 10:
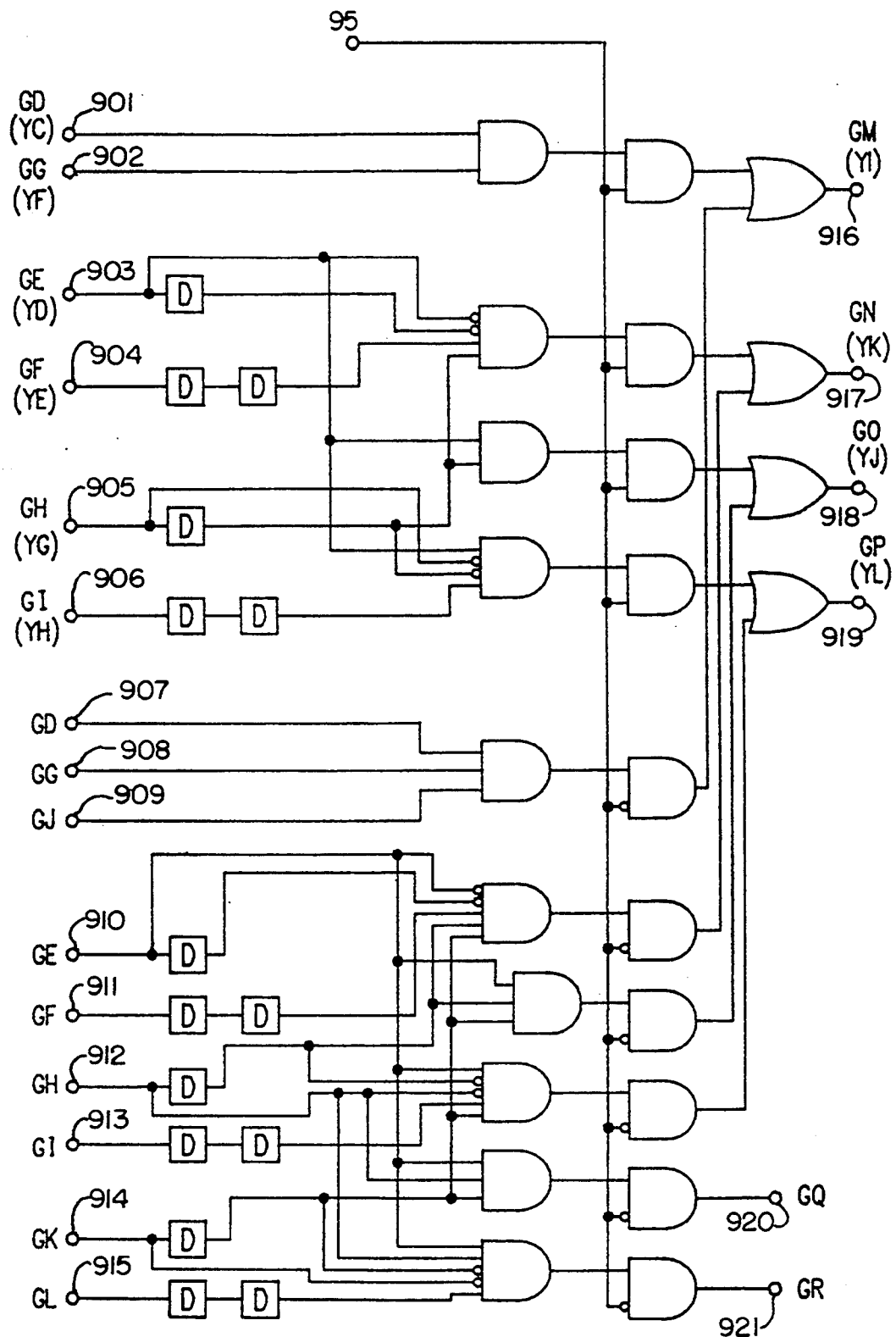
FIG. 10 shows exemplary circuitry of the synchronization/bit-shift error detecting circuit shown in FIG. 8.

FIG. 10 shows exemplary circuitry of the synchronization/bit-shift error detecting circuit 850. The synchronization/bit-shift error detecting circuit 850 can be constructed by delay circuits, AND circuits, and OR circuits. The switching signal GW is supplied through the channel switching signal input terminal 95, and an appropriate mode (Y-Pb/Pr or RGB) is selected in accordance with the signal GW.

When the Y-Pb/Pr mode is selected, the synchronization is detected or the amount of bits erroneously shifted is specified based on the signals input to the input terminals 901 to 906 shown in FIG. 10. The detected results are output from the respective output terminals 916 to 919 as signals GM to GP. this case, the signals GM, GN, GO, and GP correspond to the signals YI, YK, YJ, and YL, respectively. Accordingly, the synchronization/bit-shift error detecting circuit 850 operates in the same way as the synchronization/bit-shift error detecting circuit 17 for the 2-channel system. When the RGB mode is selected, the synchronization is detected or the amount of bits erroneously shifted is specified for the 3-channel signals, based on the signals input to the input terminals 907 to 915 shown in FIG. 10. The detected results are output from the output terminals 916 to 921.

Figure 11:
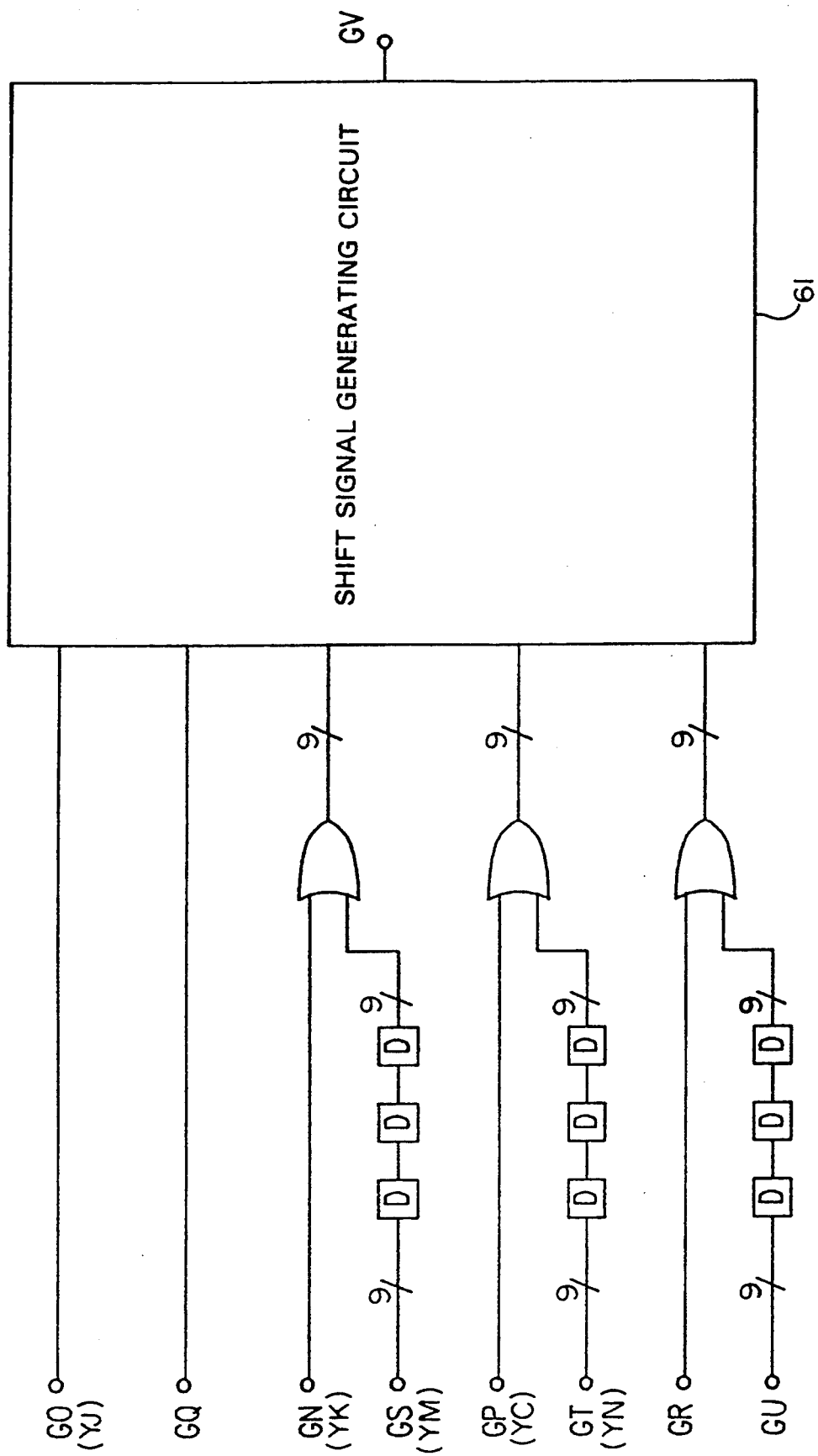
FIG. 11 shows one example of the bit-shift signal generating circuit shown in FIG. 8.

FIG. 11 shows exemplary circuitry of the bit-shift signal generating circuit 860. The bit-shift signal generating circuit 860 can be constructed by a bit-shift error value calculating circuit using delay circuits and OR circuits, and a shift signal generating circuit 61 for generating a bit-shift signal based on the calculated result. When the Y-Pb/Pr mode is selected, the bit-shift signal generating circuit 860 operates in the same way as the bit-shift signal generating circuit 18, since the input signals GO, GN, GS, GP, and GT correspond to the signals YJ, YK, YM, YL, and YN, respectively.

As is apparent from the above description, the frame synchronizing apparatus shown in FIG. 8 can detect the frame synchronization by the same operation as in the frame synchronizing apparatus in Example 1, when the Y-Pb/Pr mode is selected.

Next, a case where the RGB mode is selected is described.

The operation of the frame synchronizing apparatus in the RGB mode is first described.

The intra-channel synchronization detecting circuits 831, 832, and 833 receive the parallel data output from the serial-parallel converting circuit 820, and output synchronization patterns and pseudo-synchronization patterns, for the respective channels. The intra-channel synchronization detecting circuit 831 generates a G channel synchronization detect signal GD, a pseudo-synchronization detect signal GE, and an all-0 detect signal GF. The intra-channel synchronization detecting circuit 832 generates a B channel synchronization detect signal GG, a pseudo-synchronization detect signal GH, and an all-0 detect signal GI. The intra-channel synchronization detecting circuit 833 generates an R channel synchronization detect signal GJ, a pseudo-synchronization detect signal GK, and an all-0 detect signal GL.

The bit-shift error pattern detecting circuits 841, 842, and 843 receive the parallel data output from the serial-parallel converting circuit 820, and detect bit-shift error patterns, for the respective channels. The bit-shift error pattern detecting circuit 841 generates a bit-shift error pattern detect signal GS. The bit-shift error pattern detecting circuit 842 generates a bit-shift error pattern detect signal GT. The bit-shift error pattern detecting circuit 843 generates a bit-shift error pattern detect signal GU.

The synchronization/bit-shift error detecting circuit 850 receives the synchronization detect signals GD, GG, and GJ, the pseudo-synchronization detect signals GE, GH, and GK, and the all-0 detect signals GF, GI, and GL, and detects the synchronization among the three channels and specifies the amount of bits erroneously shifted. The synchronization/bit-shift error detecting circuit 850 generates a frame synchronization detect signal GM, and bit-shift error detect signals GN, GO, GP, GQ, and GR. It is possible to detect the synchronization among channels and specify the amount of bits erroneously shifted without the all-0 detect signals GF, GI, and GL. However, in order to perform more accurate detection, it is preferable to use such all-0 detect signals. Hereinafter, the case where the all-0 detect signals are used is described.

The bit-shift signal generating circuit 860 receives the bit-shift error detect signals GN to GR, and the bit-shift error pattern detect signals GS, GT, and GU, and calculates the number of bits erroneously shifted in the serial-parallel converting circuit 820. Then, the bit-shift signal generating circuit 860 generates a bit-shift signal GV for shifting bits by the calculated number, and outputs the signal GV to the serial-parallel converting circuit 82.

Figure 12A:
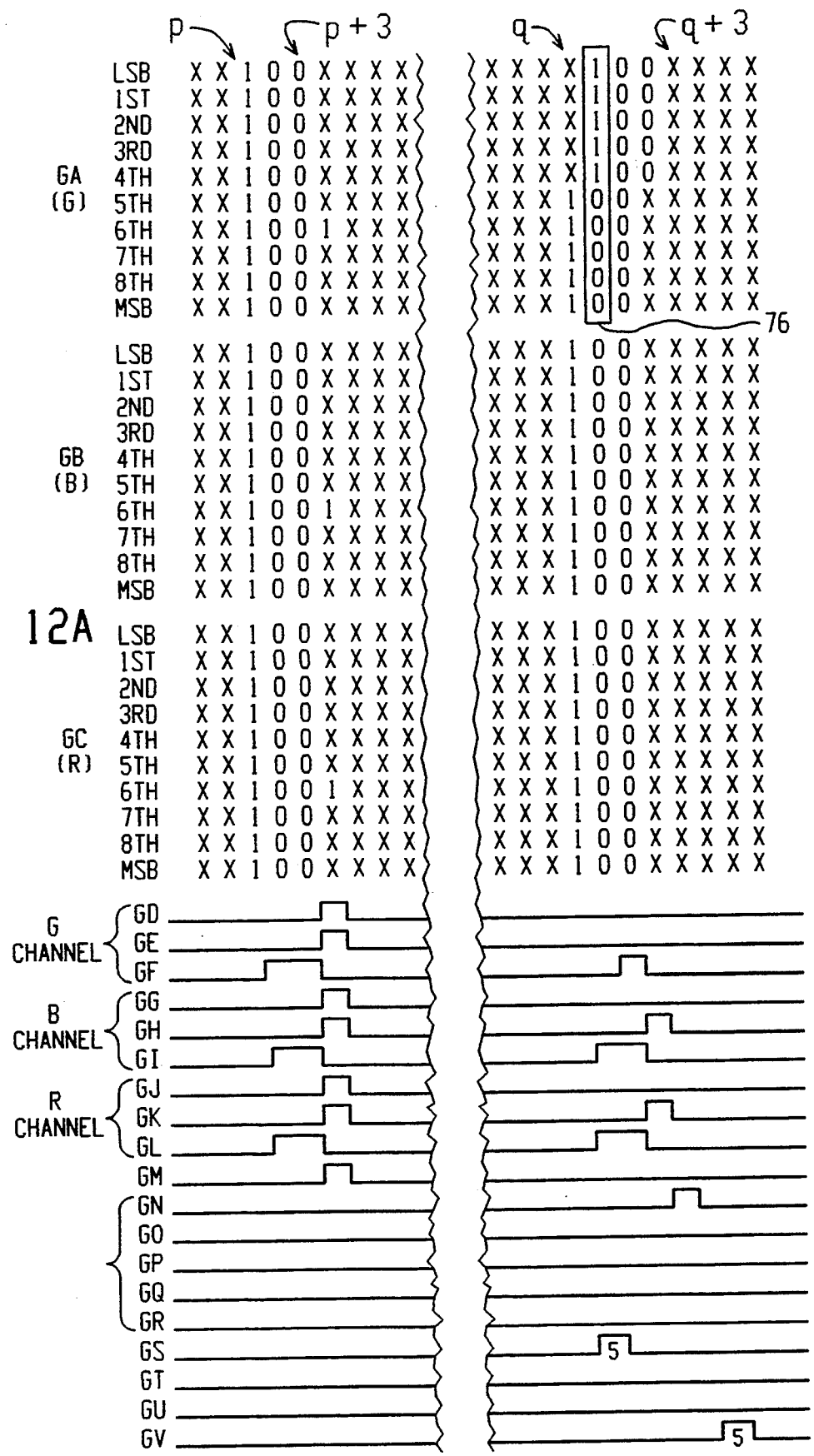
Figure 12B:
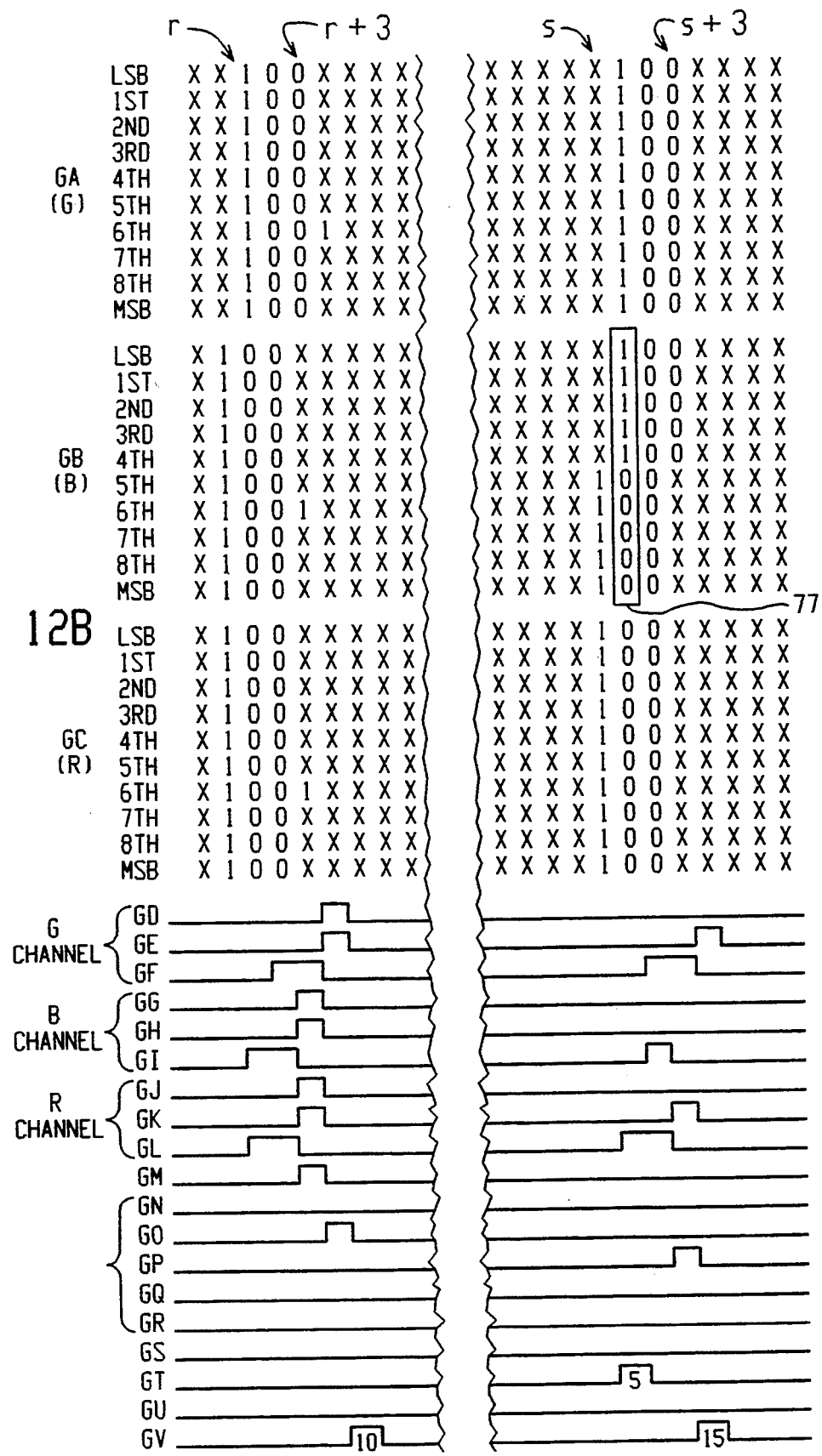

FIGS. 12A to 12C show signal patterns of parallel input data of 3 channels (signals GA, GB, and GC) and waveforms of various detect signals corresponding thereto in the frame synchronizing apparatus shown in FIG. 8. The signals GA, GB, and GC are the parallel input data of the G, B, and R channels in digital video signals of SMPTE 260M standard, respectively.

The EAV signals in the case where no bit shift error occurs in the serial-parallel input data are shown in the pth to (p+3)th words of the respective signals (GA, GB, and GC) in FIG. 12A. The intra-channel synchronization detecting circuits 831, 832, and 833 output the G channel synchronization detect signal GD, the B channel synchronization detect signal GG, and the R channel synchronization detect signal GJ, respectively.

The synchronization/bit-shift error detecting circuit 850 outputs the synchronization detect signal GM when the signals GD, GG, and GJ are simultaneously input. In this case, the bit-shift signal GV is not generated.

The EAV (or SAV) signals in the case where a 5-bit shift error occurs in the serial-parallel input data are shown in the qth to (q+3)th words of the respective signals (GA, GB, and GC) in FIG. 12A.

In this case, the 5-bit shift error is detected in the bit-shift error pattern detecting circuit 841, so as to output a 5-bit shift error pattern detect signal GS(S). In the (q+1)th word enclosed by a solid line in the G channel parallel input data in FIG. 12A, the LSB to the fourth bit take a value of 1, and the fifth bit to the MSB take a value of 0. When any shift error of 1 to 9 bits occurs, the number of bits having the value of 1 in the portion 76 enclosed by a solid line corresponds to the number of erroneously shifted bits. The bit-shift error pattern detecting circuit 841 has the same circuitry as that of the bit-shift error pattern detecting circuit shown in FIG. 4. Such a bit-shift error is detected by the 5-bit shift error pattern detecting circuit 406, and the 5-bit shift error pattern detect signal GS(5) is output to the bit-shift signal generating circuit 860.

On the other hand, in the intra-channel synchronization detecting circuit 831, a pattern of all 0 is detected in the (q+2)th word of the G channel parallel input data, and the G channel all-0 detect signal GF is output. In the intra-channel synchronization detecting circuits 832 and 833, the B channel pseudo-synchronization detect signal GH and the R channel pseudo-synchronization detect signal GK are output in the (q+3)th word of the B and R channels, respectively.

When the pseudo-synchronization detect signals GH and GK of the B and R channels are simultaneously output, but the e channel pseudo-synchronization detect signal GE is nor output, and the G channel all-0 detect signal GF is output before the B channel and R channel pseudo-synchronization detect signals GH and GK by 1 data word, the synchronization/bit-shift error detecting circuit 850 detects the shift error of 1 to 9 bits, so as to output a 1-to-9 bit-shift error detect signal GN in the (q+3)th word. The reason why the shift errors of 1 to 9 bits are determined by the signals is the same as described in Example 1.

The bit-shift signal generating circuit 860 detects the occurrence of 5-bit shift error by receiving the 1-to-9 bit-shift error detect signal GN and the 5-bit shift error pattern detect signal GS(5) before the signal GN by 2 data words, so as to output the 5-bit shift signal GV(5) to the serial-parallel converting circuit 820.

As described above, the 5-bit shift error occurring in the serial-parallel converting circuit 820 is corrected by only one bit-shift operation, and a proper frame synchronization can be detected in the next EAV portion.

In cases where shift errors of 1 to 9 bits are detected other than the 5-bit shift error, the bit-shift errors can be corrected in the same way as described above. Note that the bit-shift error pattern detect signal GS may be GS(1) to GS(9) depending on the number of erroneously shifted bits.

FIG. 12B shows a pattern of the EAV signals (signals GA, GB, and GC in the rth to (r+4)th words) in the case where a 10-bit shift error occurs in the parallel input data. When signals of such a pattern are input, the intra-channel synchronization detecting circuit 831 detects the pseudo-synchronization in the (r+4)th word of the signal GA (10 bits of 1, 10 bits of 0, and 10 bits of 0), so as to output the G channel pseudo-synchronization detect signal GE. The intra-channel synchronization detecting circuit 832 detects the pseudo-synchronization in the (r+3)th word of the signal GB, so as to output the B channel pseudo-synchronization detect signal GH. Similarly, the intra-channel synchronization detecting circuit 833 detects the pseudo-synchronization in the (r+3) th word of the signal GC, so as to output the R channel pseudo-synchronization detect signal GK.

When the B channel and R channel pseudo-synchronization detect signals GH and GK are simultaneously input and the G channel pseudo-synchronization detect signal GE is input after these signals by 1 data word, the synchronization/bit-shift error detecting circuit 850 determines the shift error to be the 10-bit shift error, so as to output a 10-bit shift error detect signal GO to the bit-shift signal generating circuit 860. The bit-shift signal generating circuit 860 outputs a bit-shift signal GV(10) for shifting 10 bits in the (r+5)th word, by receiving the signal GO. When the serial-parallel converting circuit 820 receives the 10-bit shift signal GV(10), the 10-bit shift error is corrected by only one shift operation. That is, the frame synchronization can be restored by only one bit-shift operation.

As is shown in FIG. 12B, in the case of EAV, the output timing of the G channel synchronization detect signal GD is delayed from the output timing of the B channel and the R channel synchronization detect signals GG and GJ by 1 data word. In this example, the synchronization/bit-shift error detecting circuit 850 detects the pseudo-synchronization detect signals GE, GH and GK in order to detect the 10-bit shift error. Alternatively, it is possible to detect the 10-bit shift error by using the synchronization detect signals GD, GG, and GJ.

The signals GA, GB, and GC in the sth to (s+3)th words in FIG. 12B show a pattern of EAV or SAV Signals in the case where a 15-bit shift error occurs in the parallel input data. The intra-channel synchronization detecting circuit 831 outputs the G channel pseudo-synchronization detect signal GE in the (s+4)th word. The intra-channel synchronization detecting circuit 832 outputs the B channel all-0 detect signal GI in the (s+2)th word. The intra-channel synchronization detect signal 833 outputs the R channel pseudo-synchronization detect signal GK in the (s+3)th word.

When the G channel pseudo-synchronization detect signal GE is input, the B channel all-0 detect signal GI is input before the signal GE by 2 data words, and the R channel pseudo-synchronization detect signal GK is input before the signal GE by 1 data word, the synchronization/bit-shift error detecting circuit 850 determines the shift error to be the shift error of 11 to 19 bits, so as to output a 11-to-19 bit-shift error detect signal GP in the (s+4)th word.

In the bit-shift error pattern detecting circuit 842, by detecting the pattern of the (s+1)th word (the portion 77 enclosed by a solid line) in the B channel parallel input data, the 5-bit shift error pattern detect signal GT(5) is output in the (s+1)th word.

When the bit-shift signal generating circuit 860 receives the 11-to-19 bit-shift error detect signal GP, and receives the 5-bit shift error pattern detect signal GT earlier than the signal GP by 3 data words, the bit-shift signal generating circuit 860 detects the 15-bit shift error. Then, the bit-shift signal generating circuit 860 outputs the 15-bit shift signal GV(15) to the serial-parallel converting circuit 820 in the (s+5)th word.

When the serial-parallel converting circuit 820 receives the 15-bit shift signal GV(15), the 15-bit shift error can be corrected by one shift operation. That is, the frame synchronization can be restored by only one bit-shift operation.

In cases where shift errors of 11 to 19 bits are detected other than the 15-bit shift error, such bit shift errors can be corrected in the same way as described above. Note that the bit-shift error pattern detect signal GT may be GT(1) to GT(9) depending on the number of erroneously shifted bits.

FIG. 12C shows a pattern of EAV signals (the signals GA, GB, and GC in the tth to (t+4)th words) in the case where a 20-bit shift error occurs in the parallel input data. When signals of such a pattern are input, the intra-channel synchronization detecting circuit 831 detects the pseudo-synchronization (10 bits of 1, 10 bits of 0, and 10 bits of 0) in the (t+4)th word of the signal GA, so as to output the G channel pseudo-synchronization detect signal GE. The intra-channel synchronization detecting circuit 832 detects the pseudo-synchronization in the (t+4)th word of the signal GB, so as to output the B channel pseudo-synchronization detect signal G M. The intra-channel synchronization detecting circuit 833 detects the pseudo-synchronization detect in the (t+3)th word in the signal GC, so as to output the R channel pseudo-synchronization detect signal GK.

When the G channel and The B channel pseudo-synchronization detect signals GE and GH are simultaneously input and the R channel pseudo-synchronization detect signal OK is input before these signals by 1 data word, the synchronization/bit-shift error detecting circuit 850 determines the shift error to be the 20-bit shift error, so as to output the 20-bit shift error detect signal GQ to the bit-shift signal generating circuit 880. When the bit-shift signal generating circuit 860 receives the signal GQ, the bit-shift signal generating circuit 860 outputs a bit-shift signal GV(20) for shifting 20 bits in the (t+5)th word. When the serial-parallel converting circuit 820 receives the 20-bit shift signal GV(20), the 20-bit shift error is corrected by only one shift operation. As a result, the frame synchronization can be restored by only one shift operation.

As in the 10-bit shift error case, in the EAV case, the synchronization/bit-shift error detecting circuit 850 can detect the 20-bit shift error by using the synchronization detect signals GD, GG, and GJ instead of the pseudo-synchronization detect signals GE, GH, and GK.

The signals GA, GB, and GC in the uth to (u+3)th words in FIG. 12C show a pattern of EAV or SAV signals An the case where a 25-bit shift error occurs in the parallel input data. The intra-channel synchronization detecting circuit 831 outputs the G channel pseudo-synchronization detect signal GE in the (u+4)th word. Similarly, the intra-channel synchronization detecting circuit 832 outputs the B channel pseudo-synchronization detect signal GH in the (u+4)th word. The intra-channel synchronization detecting circuit 833 outputs the R channel all-0 detect signal GL in the (u+2)th word.

The synchronization/bit-shift error detecting circuit 850 determines the occurrence of shift error of 21 to 29 bits by simultaneously receiving the G channel and B channel pseudo-synchronization detect signals GE and GH, and by receiving the R channel all-0 detect signal GL before the signals GE and GH by 2 data words, so as to output a 21-to-29 bit shift error detect signal GR in the (u+4)th word.

When a pattern 78 (a portion enclosed by a solid line) An the (u+1)th word in the R channel parallel input data is detected, the bit-shift error pattern detecting circuit 843 outputs the 5-bit shift error pattern detect signal GU(5) in the (u+1)th word.

When the bit-shift signal generating circuit 860 receives the 21-to-29 bit shaft error detect signal GR and receives the 5-bit shift error pattern detect signal GU earlier than the signal GR by 3 data words, the bit-shift signal generating circuit 860 detects the 25-bit shift error, so as to output the 25-bit shift signal GV(25) to the serial-parallel converting circuit 820 in the (u+5)th word.

When the serial-parallel converting circuit 820 receives the 25-bit shift signal GV(25), the serial-parallel converting circuit 820 performs the correction of the 25-bit shift error by only one shift operation. That is, the frame synchronization can be restored by only one bit-shift operation.

In cases where shift errors of 21 to 29 bits are detected other than the 25-bit shift error, such bit-shift errors can be corrected in the same way as described above. Note that the bit-shift error pattern detect signal GU may be GU(1) to GU(9) depending on the number of erroneously shifted bits.

As described above, the frame synchronizing apparatus shown in FIG. 8 can restore the frame synchronization by one shift operation, for any shift error of 1 bit to 29 bits.

Figure 22:
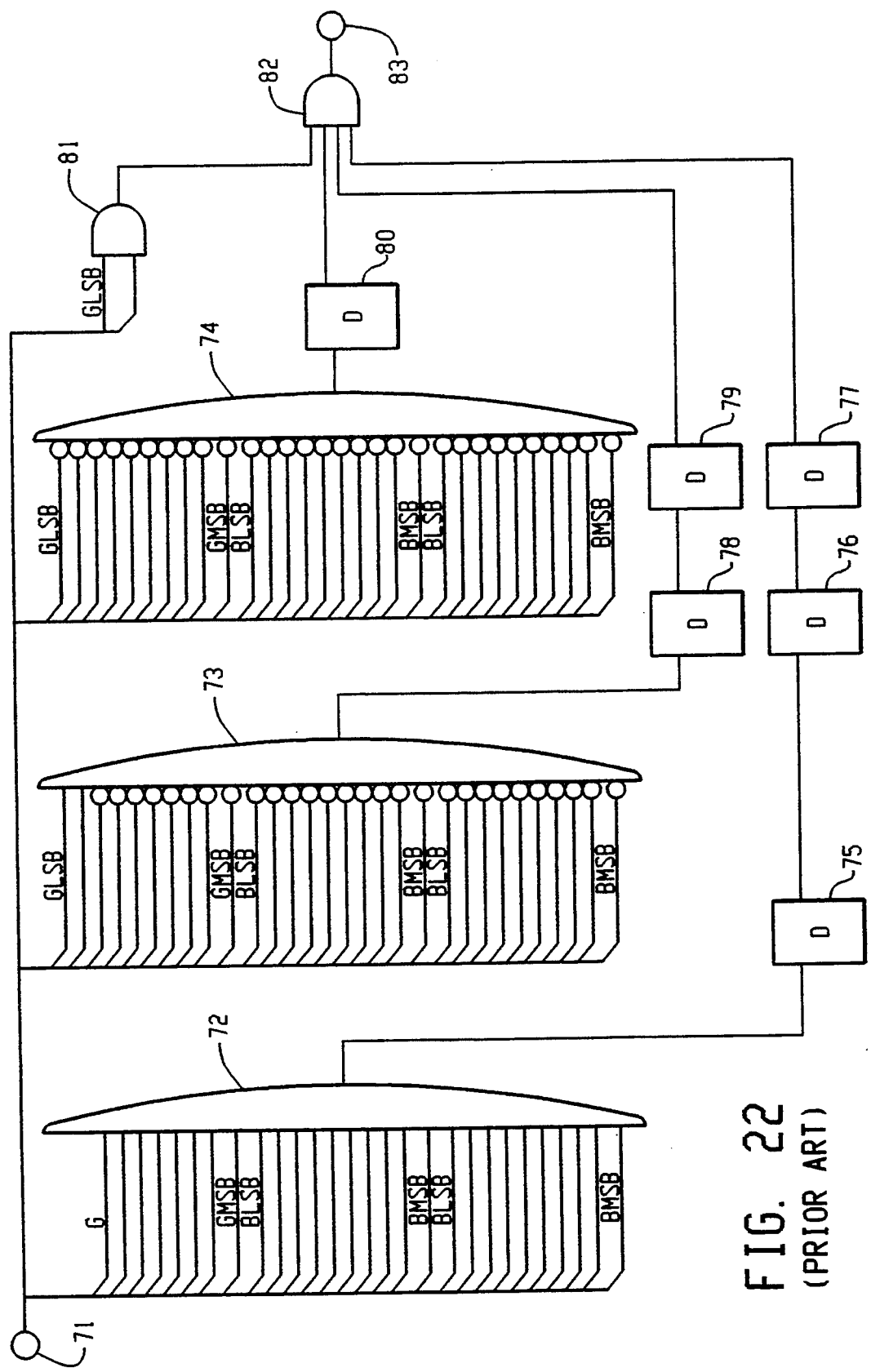
FIG. 22 shows an RGB 2-bit shift error detecting circuit in the frame synchronizing apparatus shown in FIG. 20.

The frame synchronizing apparatus of this example includes three intra-channel synchronization detecting circuits shown in FIG. 3, and three bit-shift error pattern detecting circuits shown in FIG. 4. Thus, the operating mode of the apparatus is switched depending on the number of channels of the input video signals such as video signals Of the SMPTE 260M standard. Accordingly, the frame synchronizing apparatus can detect the bit shift error of 1 bit to 19 bits in the Y-Pb/Pr system, and can also detect the bit shift error of 1 bit to 29 bits in the RGB system. Therefore, the frame synchronizing apparatus of this example can be constructed in a very small circuit scale as compared with the conventional frame synchronizing apparatus shown in FIG. 22 which necessitates twenty-nine bit-shift error pattern detecting circuits (RGB system).

Moreover, the frame synchronizing apparatus of this example can correct the bit-shift error by one bit-shift operation, so that the bit-shift error can be corrected in a shorter time period than that required for the bit-shift error correction in the conventional frame synchronizing apparatus.

In addition, signals which are converted into parallel signals are used for the detection of the frame synchronization, so that the circuit consumes a reduced amount of power.

Figure 13:
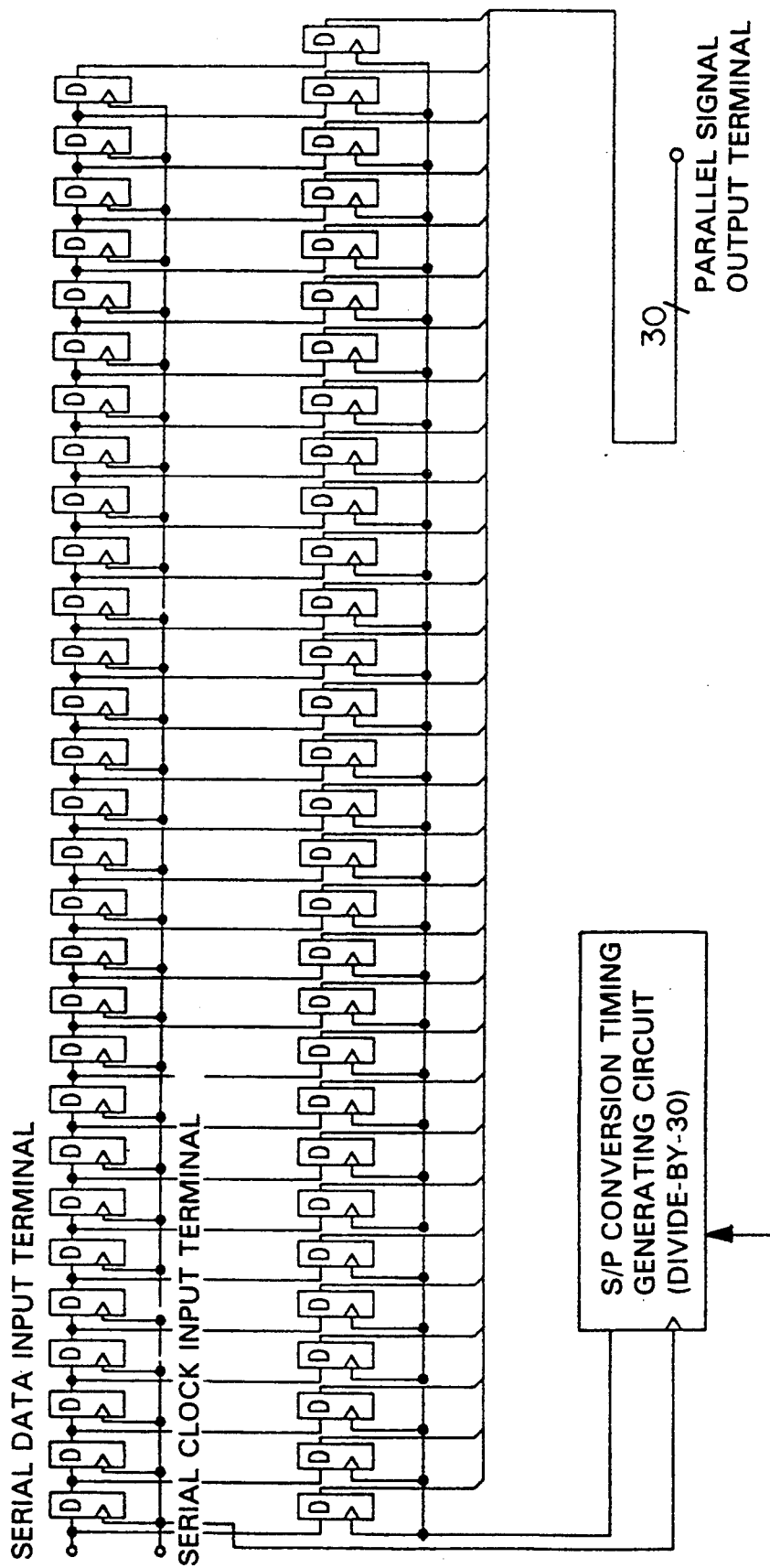
FIG. 13 shows another example of the serial-parallel converting circuit.
Figure 14:
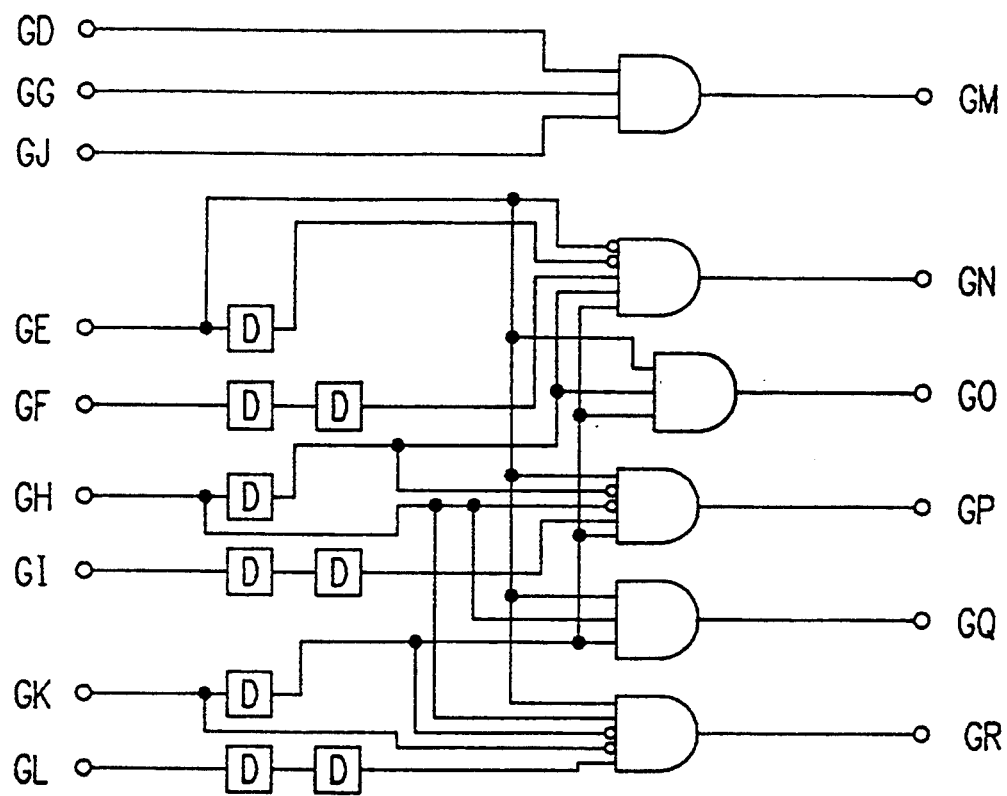
FIG. 14 shows another exemplary circuitry of the synchronization/bit-shift error detecting circuit.
Figure 15:
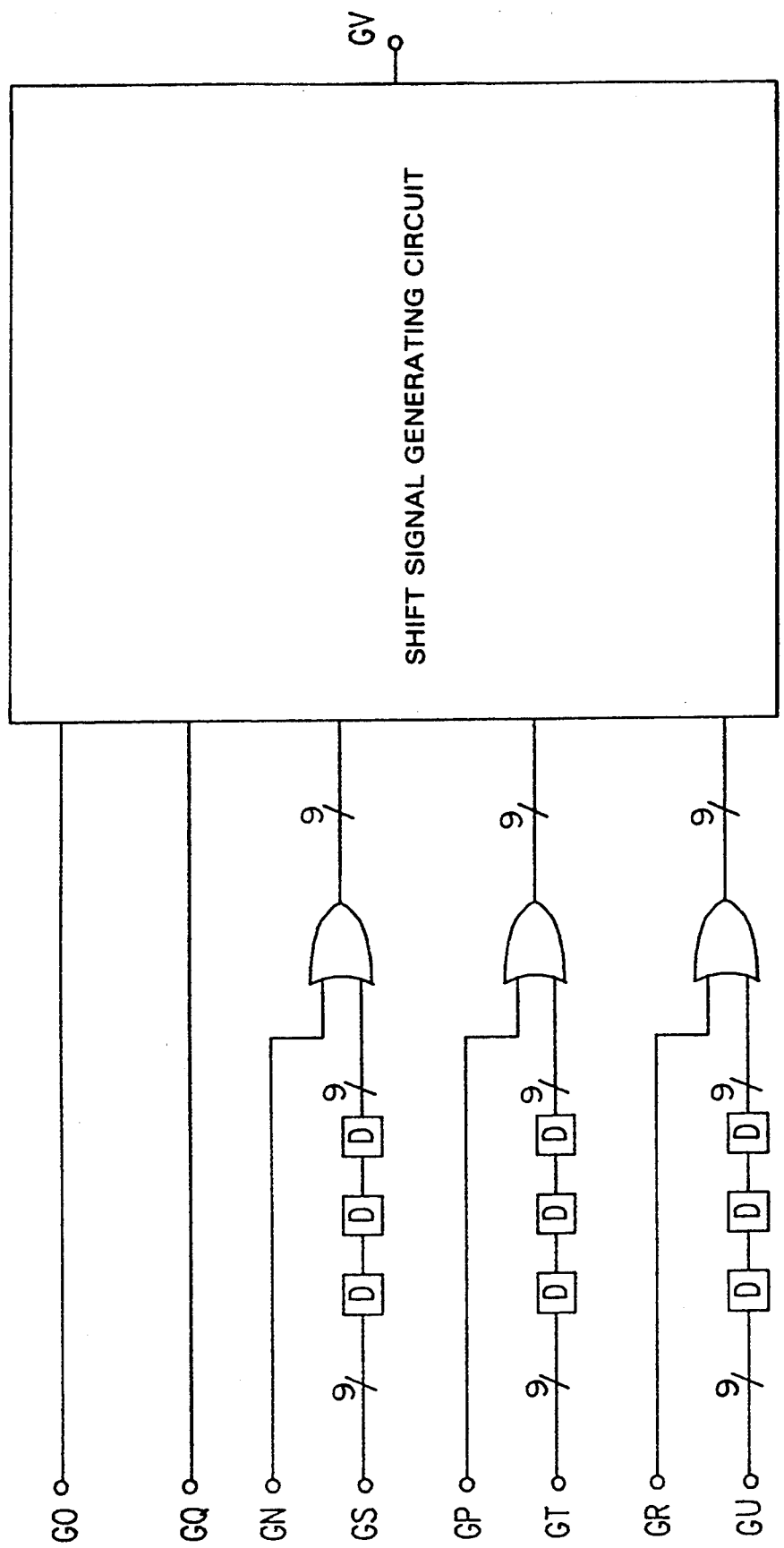
FIG. 15 shows another example of the bit-shift signal generating circuit.
Figure 16:
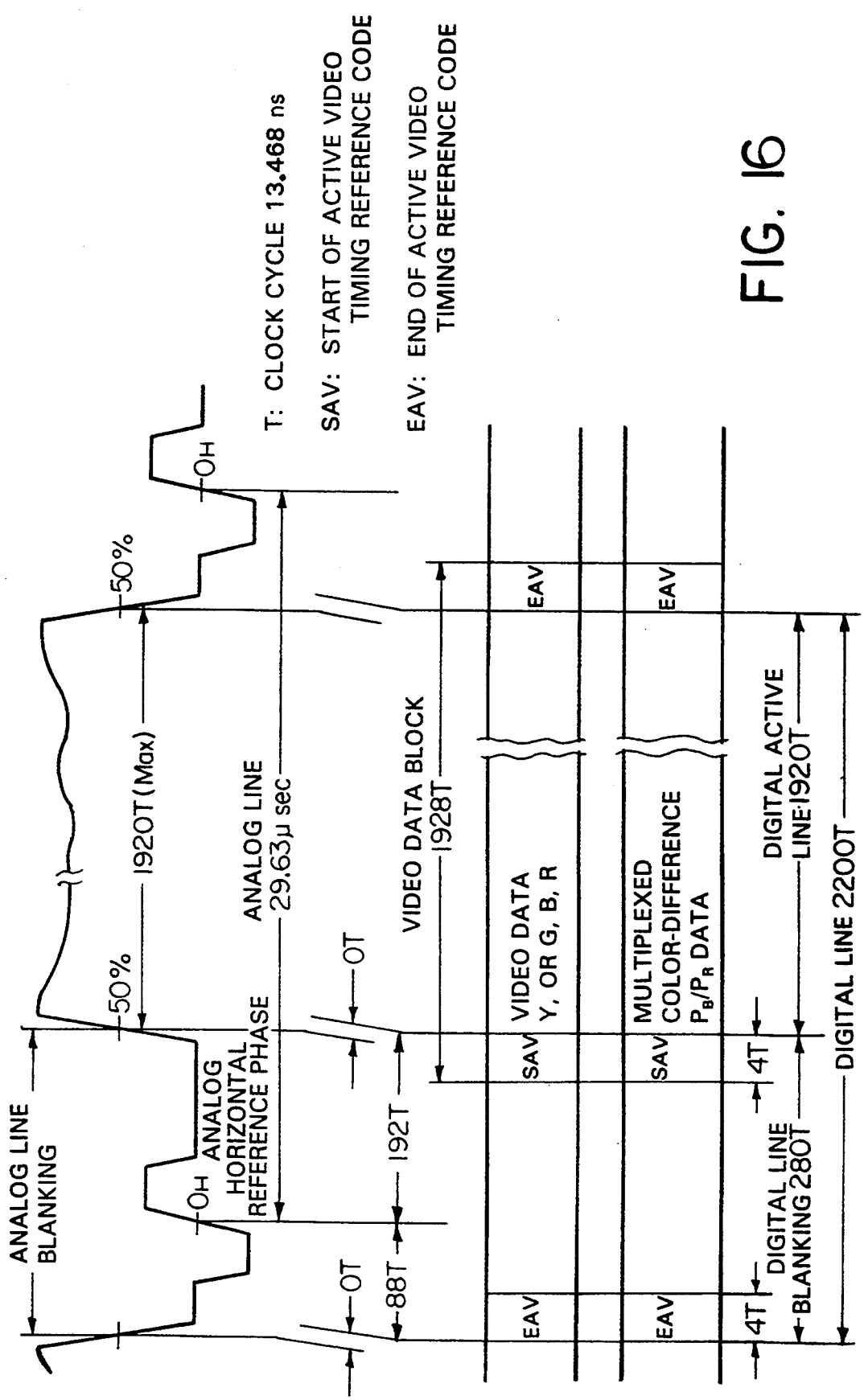
FIG. 16 shows the timing relationship between an analog blanking interval, and EAV and SAV in SMPTE 260M video signals.
Figure 17A:
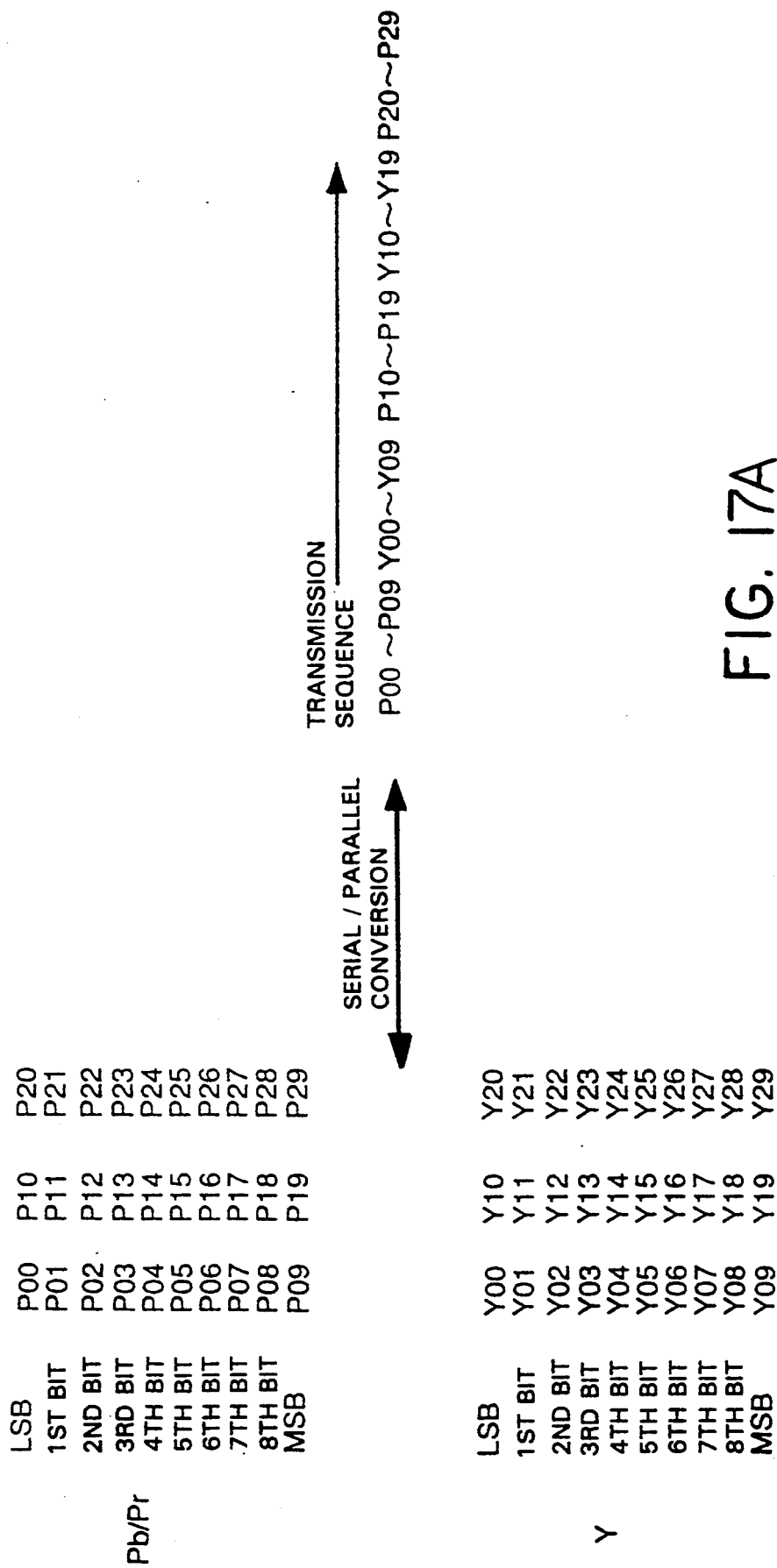
FIG. 17A shows a conversion from serial signals into parallel signals in a Y-Pb/Pr system.
Figure 17B:
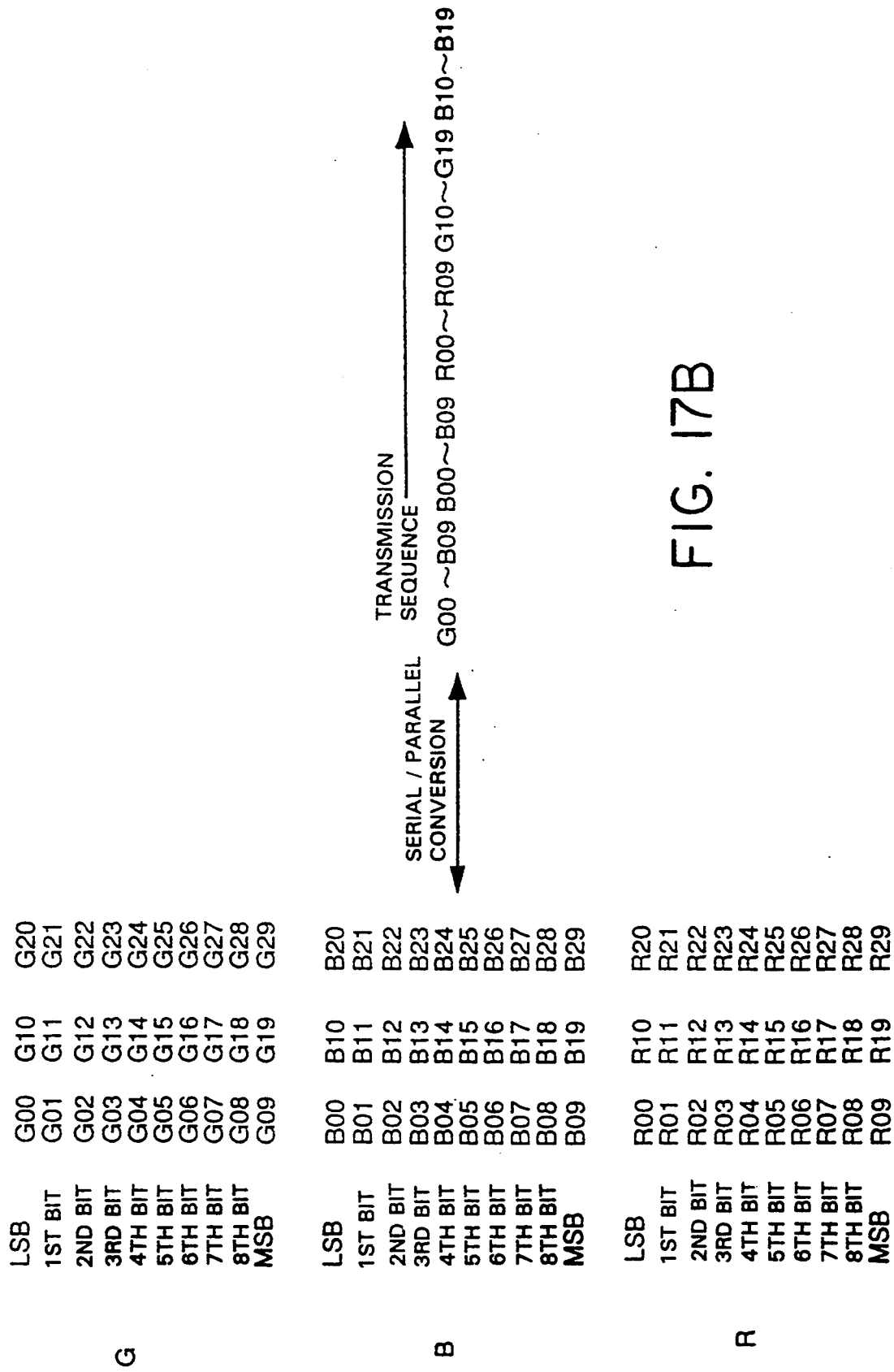
FIG. 17B shows a conversion from serial signals into parallel signals in an RGB system.
Figure 18:
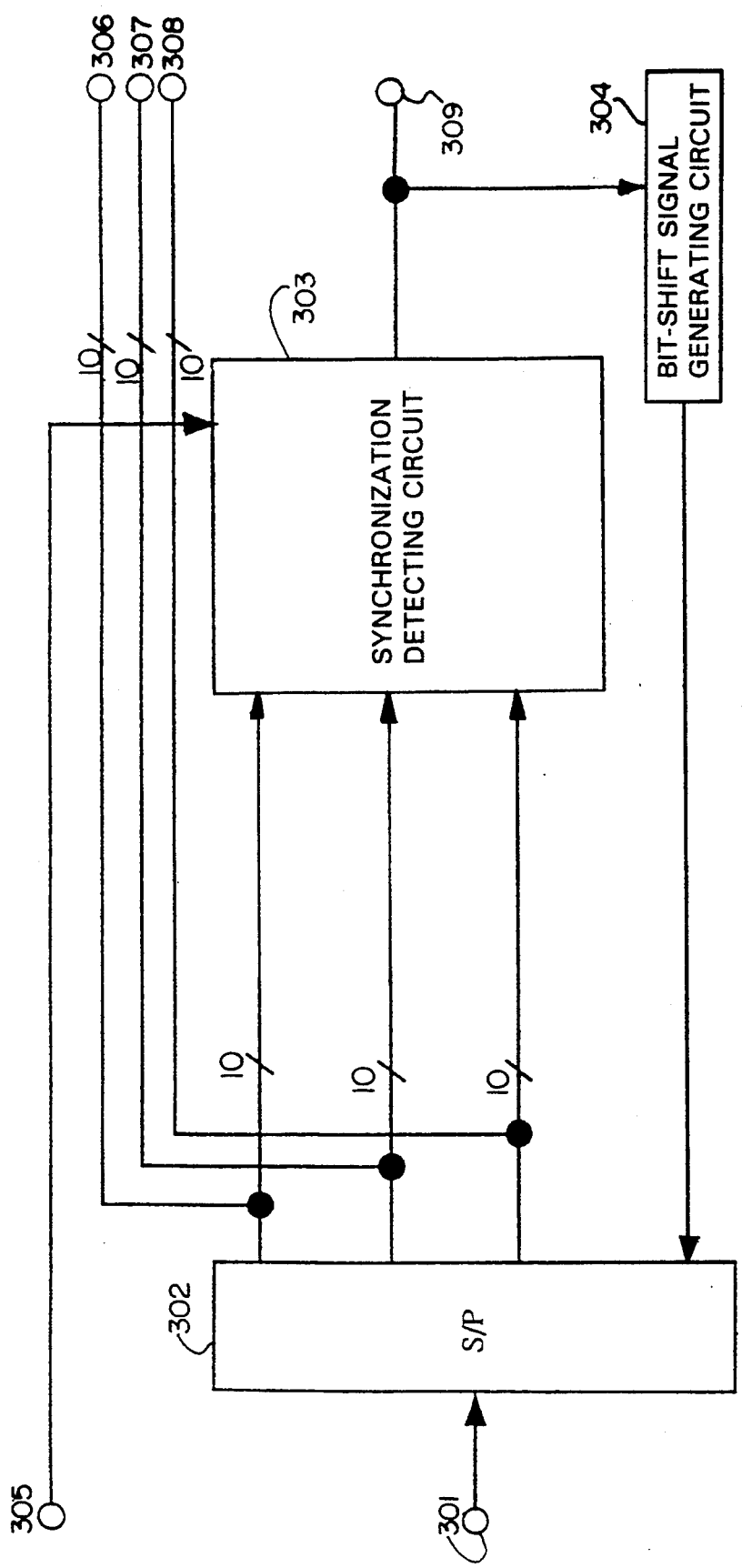
FIG. 18 shows an example of a conventional frame synchronizing apparatus in the RGB system.
Figure 19:
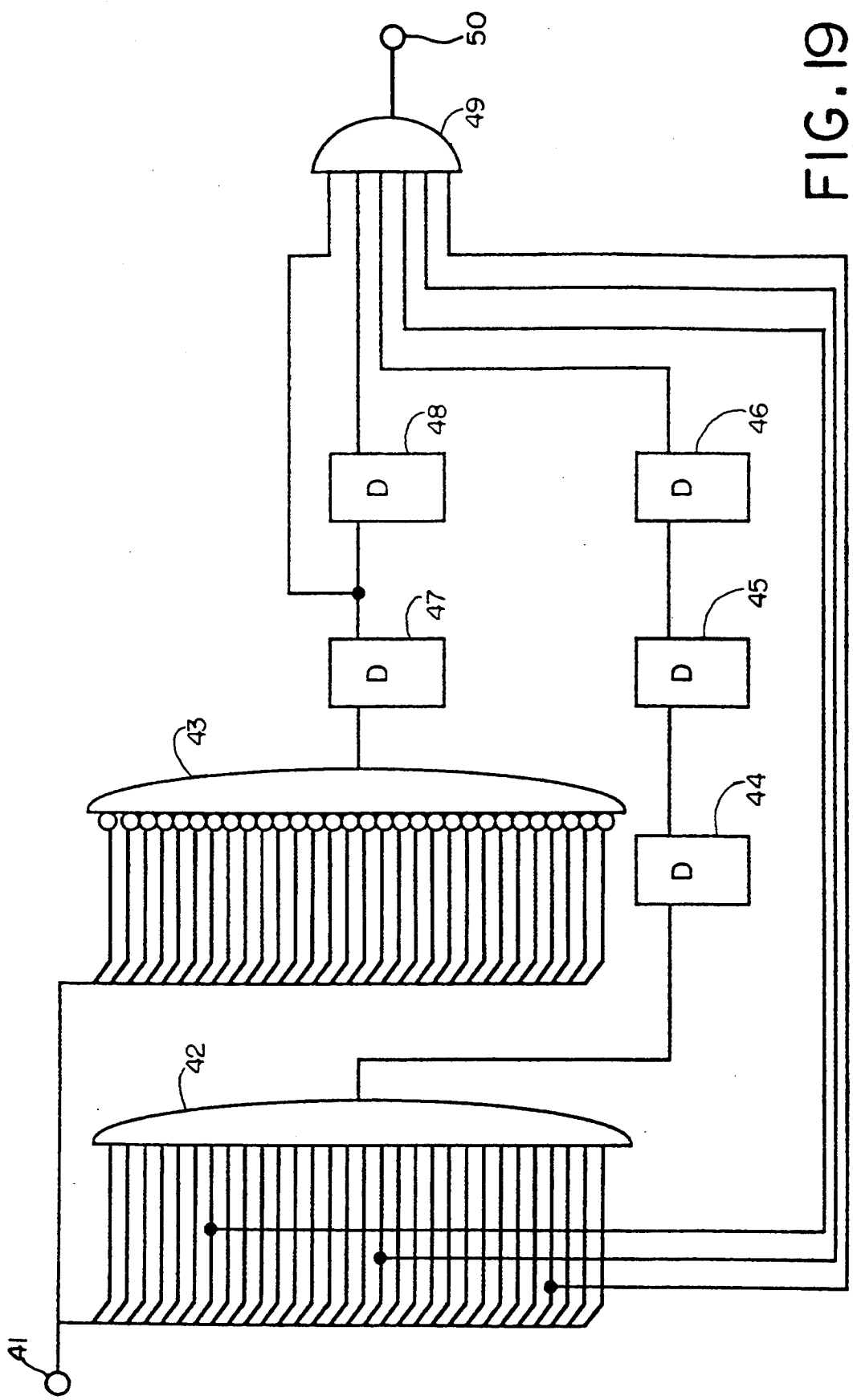
FIG. 19 shows a synchronization detecting circuit in the frame synchronizing apparatus shown in FIG. 18.

In the above two examples, the frame synchronizing apparatus which can be used for both the 2-channel and the 3-channel parallel input data have been described. Alternatively, the frame synchronizing apparatus can be constructed only for the 3-channel parallel input data. FIG. 13 shows a serial-parallel converting circuit for 3-channel system. FIG. 14 shows a synchronization/bit-shift error detecting circuit for 3-channel system. FIG. 15 shows a bit-shift signal generating circuit for 3-channel system. The respective circuits operate in the same way as those in the RGB mode of the frame synchronizing apparatus of Example 2.

As described above, the frame synchronizing apparatus of this invention includes intra-channel synchronization detecting circuits and bit-shift error pattern detecting circuits, and the number of respective circuits corresponds to the number of channels of the parallel input data, whereby the bit-shift error of 1 bit to 19 bits in the Y-Pb/Pr system and also the bit-shift error of 1 bit to 29 bits in the RGB system of the video signals of the SMPTE 260M standard can be detected. The frame synchronizing apparatus of this invention can be constructed in a very small circuit scale as compared with the conventional frame synchronizing apparatus.

Furthermore, the frame synchronizing apparatus of this invention can correct the detected bit-shift error by one bit-shift operation, so that the bit-shift error can be corrected in a shorter time period than that required for the correction of the bit-shift error in the conventional frame synchronizing apparatus.

Also, the frame synchronizing apparatus of this invention switches the mode depending on the number of channels of the parallel input data. Accordingly, it can accommodate both The Y-Pb/Pr system and the RGB system of video signals of the SMPTE 260M standard, and can detect any bit-shift error in the respective modes.

The signals which are converted into the parallel signals are used for the detection of frame synchronization, so that the detection of bit-shift error and the correction of the detected bit-shift error can be performed by a reduced amount of power consumption.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A frame synchronizing apparatus comprising:
    a serial-parallel converter for converting input serial data into parallel data having a plurality of channels, and for outputting said parallel data separately for each of said plurality of channels;
    a plurality of intra-channel synchronization detecting circuits each for receiving said parallel data in a corresponding one of said plurality of channels output from said serial-parallel converter, for detecting a synchronization pattern and a pseudo-synchronization pattern for the corresponding channel, and for generating a channel synchronization detect signal and a pseudo-synchronization detect signal for the corresponding channel;
    a plurality of bit-shift error pattern detecting circuits each for receiving said parallel data in a corresponding one of said plurality of channels output from said serial-parallel converter, for detecting a bit-shift error pattern for the corresponding channel, and for generating a bit-shift error pattern signal for the corresponding channel;
    a synchronization/bit-shift error detecting circuit for receiving the channel synchronization detect signals and the pseudo-synchronization detect signals, for detecting a synchronization between channels and specifying the amount of erroneously shifted bits, and for generating a frame synchronization detect signal and bit-shift error detect signals; and a bit-shift signal generating circuit for receiving said bit-shift error detect signals and the bit-shift error pattern signals, for calculating the number of erroneously shifted bits in said serial-parallel converter, and for generating a bit-shift shift signal, said bit-shift signal being supplied to said serial-parallel converter by which the calculated number of bits are shifted.

2. A frame synchronizing apparatus comprising:

a serial-parallel converter for converting input serial data into parallel data having a plurality of channels, and for outputting said parallel data separately for each of said plurality of channels;

a plurality of intra-channel synchronization detecting circuits each for receiving said parallel data in a corresponding one of said plurality of channels output from said serial-parallel converter, for detecting a synchronization pattern and a pseudo-synchronization pattern for the corresponding channel, and for generating a channel synchronization detect signal, a pseudo-synchronization detect signal and an all-0 detect signal for the corresponding channel;

a plurality of bit-shift error pattern detecting circuits each for receiving said parallel data in a corresponding one of said plurality of channels output from said serial-parallel converter, for detecting a bit-shift error pattern for the corresponding channel, and for generating a bit-shift error pattern signal for the corresponding channel;

a synchronization/bit-shift error detecting circuit for receiving the channel synchronization detect signals, the pseudo-synchronization detect signals, and the all-0 detect signals, for detecting a synchronization between channels and specifying the amount of bits which are erroneously shifted, and for generating a frame synchronization detect signal and bit-shift error detect signals; and a bit-shift signal generating circuit for receiving said bit-shift error detect signals and the bit-shift error pattern signals, for calculating the number of erroneously shifted bits in said serial-parallel converter, and for generating a bit-shift signal, said bit-shift signal being supplied to said serial-parallel converter by which the calculated number of bits are shifted.

3. A frame synchronizing apparatus according to claim 1, further comprising mode selecting means, said mode selecting means including:

first switching means for selecting the number of said plurality of channels of said parallel data outputted from said serial-parallel converter; and second switching means for switching the operation of said synchronization/bit-shift error detecting circuit depending on the selected number of said plurality of channels.

4. A frame synchronizing apparatus according to claim 3, wherein said first switching means and said second switching means are controlled by a switching signal.

5. A frame synchronizing apparatus according to claim 2, further comprising mode selecting means, said mode selecting means including:

first switching means for selecting the number of said plurality of channels of said parallel data outputted from said serial-parallel converter; and second switching means for switching the operation of said synchronization/bit-shift error detecting circuit depending on the selected number of said plurality of channels.

6. A frame synchronizing apparatus according to claim 5, wherein said first switching means and said second switching means are controlled by a switching signal.

7. A frame synchronizing apparatus according to claim 4, wherein the number of said plurality of intra-channel synchronization detecting circuits and the number of said plurality of bit-shift error pattern detecting circuits are 3, respectively, said serial-parallel converter converts said input serial data into parallel data of 2 channels or 3 channels in accordance with said switching signal, and outputs said parallel data separately for said 2 or 3 channels, said synchronization/bit-shift error detecting circuit receives two sets or three sets of said channel synchronization detect signals and said pseudo-synchronization detect signals output from said three intra-channel synchronization detecting circuits, and generates said frame synchronization detect signal and said bit-shift error detect signals for said 2 or 3 channels in accordance with said switching signal, and said bit-shift signal generating circuit receives said bit-shift error detect signals and said bit-shift error pattern signals for said 2 or 3 channels, and calculates the number of erroneously shifted bits in said serial-parallel converter corresponding to said 2 or 3 channels.

8. A frame synchronizing apparatus according to claim 7, wherein one of said plurality of channels of said parallel data is constituted of 10 bits.

9. A frame synchronizing apparatus according to claim 7, wherein said two channels correspond to a Pb/Pr signal and a Y signal of video signals, respectively, and said three channels correspond to a G signal, a B signal and an R signal of video signals, respectively.

10. A frame synchronizing apparatus according to claim 7, wherein said input serial data are high-definition television digital signals.

11. A frame synchronizing apparatus according to claim 7, wherein said input serial data are digital video signals based on SMPTE 260M standard.

12. A frame synchronizing apparatus according to claim 6, wherein the number of said plurality of intra-channel synchronization detecting circuits and the number of said plurality of bit-shift error pattern detecting circuits are 3, respectively, said serial-parallel converter converts said input serial data into parallel data of 2 channels or 3 channels in accordance with said switching signal, and outputs said parallel data separately for said 2 or 3 channels, said synchronization/bit-shift error detecting circuit receives two sets or three sets of said channel synchronization detect signals, said pseudo-synchronization detect signals and all-0 detect signals output from said three intra-channel synchronization detecting circuits, and generates said frame synchronization detect signal and said bit-shift error detect signals for said 2 or 3 channels in accordance with said switching signal, and said bit-shift signal generating circuit receives said bit-shift error detect signals and said bit-shift error pattern signals for said 2 or 3 channels, and calculates the number of erroneously shifted bits in said serial-parallel converter corresponding to said 2 or 3 channels.

13. A frame synchronizing apparatus according to claim 12, wherein one of said plurality of channels of said parallel data is constituted of 10 bits.

14. A frame synchronizing apparatus according to claim 12, wherein said two channels correspond to a Pb/Pr signal and a Y signal of video signals, respectively, and said three channels correspond to a G signal, a B signal and an R signal of video signals, respectively.

15. A frame synchronizing apparatus according to claim 12, wherein said input serial data are high-definition television digital signals.

16. A frame synchronizing apparatus according to claim 12, wherein said input serial data are digital video signals based on SMPTE 260M standard.

17. A frame synchronizing method comprising:
 a serial-parallel converting step for converting input serial data into parallel data having a plurality of channels, and for outputting said parallel data separately for each of said plurality of channels;
 an intra-channel synchronization detecting step for, with respect to each of said plurality of channels, detecting a synchronization pattern and a pseudo-synchronization pattern of said parallel data, and for generating a channel synchronization detect signal, a pseudo-synchronization detect signal and an all-0 detect signal;
 a bit-shift error pattern detecting step for, with respect to each of said plurality of channels, detecting a bit-shift error pattern of said parallel data, and for generating a bit-shift error pattern signal;
 a synchronization/bit-shift error detecting step for detecting a synchronization between channels and specifying the amount of bits which are erroneously shifted, based on the channel synchronization detect signals, the pseudo-synchronization detect signals, and the all-0 detect signals, and for generating a frame synchronization detect signal and bit-shift error detect signals; and
 a bit-shift signal generating step for calculating the number of erroneously shifted bits in said serial-parallel converting step, based on said bit-shift error detect signals and said bit-shift error pattern signal, and for generating a bit-shift signal by which the calculated number of bits are shifted.

18. A frame synchronizing method according to claim 17, further comprising:
 a channel switching step for selecting the number of said plurality of channels of said parallel data converted in said serial-parallel converting step depending on the number of channels of video signals to be input; and
 a controlling step for controlling said synchronization/bit-shift error detecting step based on the number of said channels of said video signals.

* * * * *